US009020918B2

(12) United States Patent
Ikenoue et al.

(10) Patent No.: US 9,020,918 B2
(45) Date of Patent: Apr. 28, 2015

(54) INFORMATION REGISTRATION DEVICE, INFORMATION REGISTRATION METHOD, INFORMATION REGISTRATION SYSTEM, INFORMATION PRESENTATION DEVICE, INFORMATON PRESENTATION METHOD, INFORMATON PRESENTATON SYSTEM, AND PROGRAM

(71) Applicant: Sony Corporation, Tokyo (JP)

(72) Inventors: Shoichi Ikenoue, Chiba (JP); Takayuki Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 13/670,705

(22) Filed: Nov. 7, 2012

(65) Prior Publication Data

US 2013/0124518 A1    May 16, 2013

(30) Foreign Application Priority Data

Nov. 14, 2011    (JP) .................................. 2011-249178

(51) Int. Cl.
G06F 17/30 (2006.01)
(52) U.S. Cl.
CPC .............................. G06F 17/30011 (2013.01)
(58) Field of Classification Search
CPC ............................................. G02B 2027/0138
USPC ....................................................... 707/711
See application file for complete search history.

(56) References Cited

U.S. PATENT DOCUMENTS

| 6,647,328 | B2 * | 11/2003 | Walker ............................. 701/36 |
| 6,795,041 | B2 * | 9/2004 | Ogawa et al. ...................... 345/7 |
| 7,212,662 | B2 * | 5/2007 | Mossakowski ............... 382/154 |
| 7,259,357 | B2 * | 8/2007 | Walker ........................... 219/243 |
| 7,877,696 | B2 * | 1/2011 | Telek et al. .................... 715/752 |
| 7,882,442 | B2 * | 2/2011 | Lawther et al. ............... 715/748 |
| 2001/0056544 | A1 * | 12/2001 | Walker ........................... 713/200 |
| 2004/0049324 | A1 * | 3/2004 | Walker .............................. 701/1 |
| 2006/0020617 | A1 * | 1/2006 | Grimminger et al. ........ 707/102 |
| 2006/0274951 | A1 * | 12/2006 | Mossakowski ............... 382/232 |
| 2008/0091309 | A1 * | 4/2008 | Walker .............................. 701/1 |
| 2008/0165081 | A1 * | 7/2008 | Lawther et al. ................ 345/1.2 |
| 2008/0165082 | A1 * | 7/2008 | Manico et al. ................. 345/1.3 |
| 2008/0235574 | A1 * | 9/2008 | Telek et al. .................... 715/240 |
| 2011/0090322 | A1 * | 4/2011 | Lawther et al. ................ 348/52 |

FOREIGN PATENT DOCUMENTS

JP    3558104    5/2004

OTHER PUBLICATIONS

U.S. Appl. No. 13/670,726, filed Nov. 7, 2012, Ikenoue, et al.

* cited by examiner

Primary Examiner — Baoquoc N To
(74) Attorney, Agent, or Firm — Oblon, McClelland, Maier & Neustadt, L.L.P.

(57) ABSTRACT

An information registration device includes an object information acquiring unit and a content information registering unit. The object information acquiring unit acquires object information obtained by performing processing for detecting and identifying an object for image data. The content information registering unit registers target content information in a database in association with the object information.

20 Claims, 17 Drawing Sheets

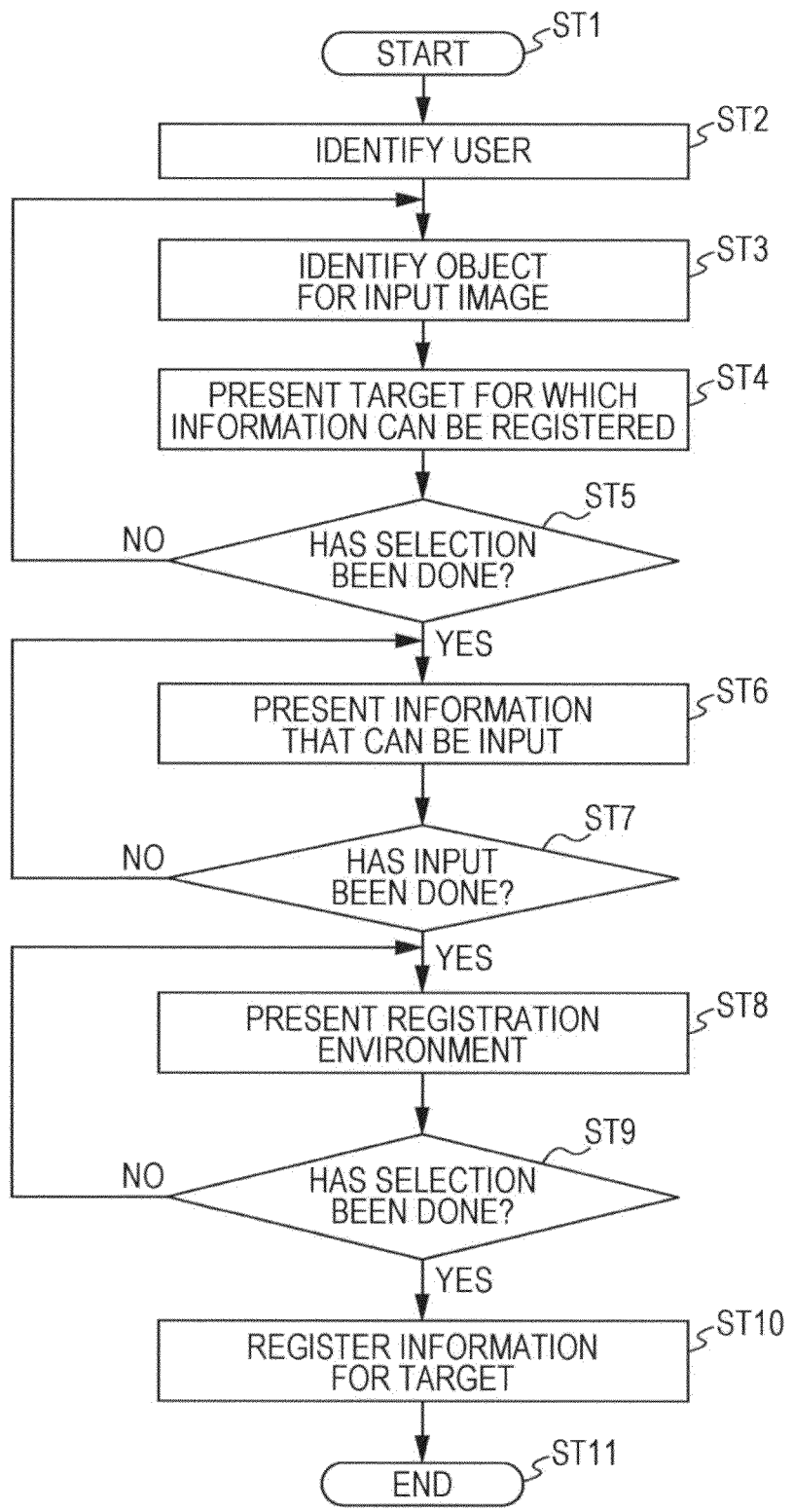

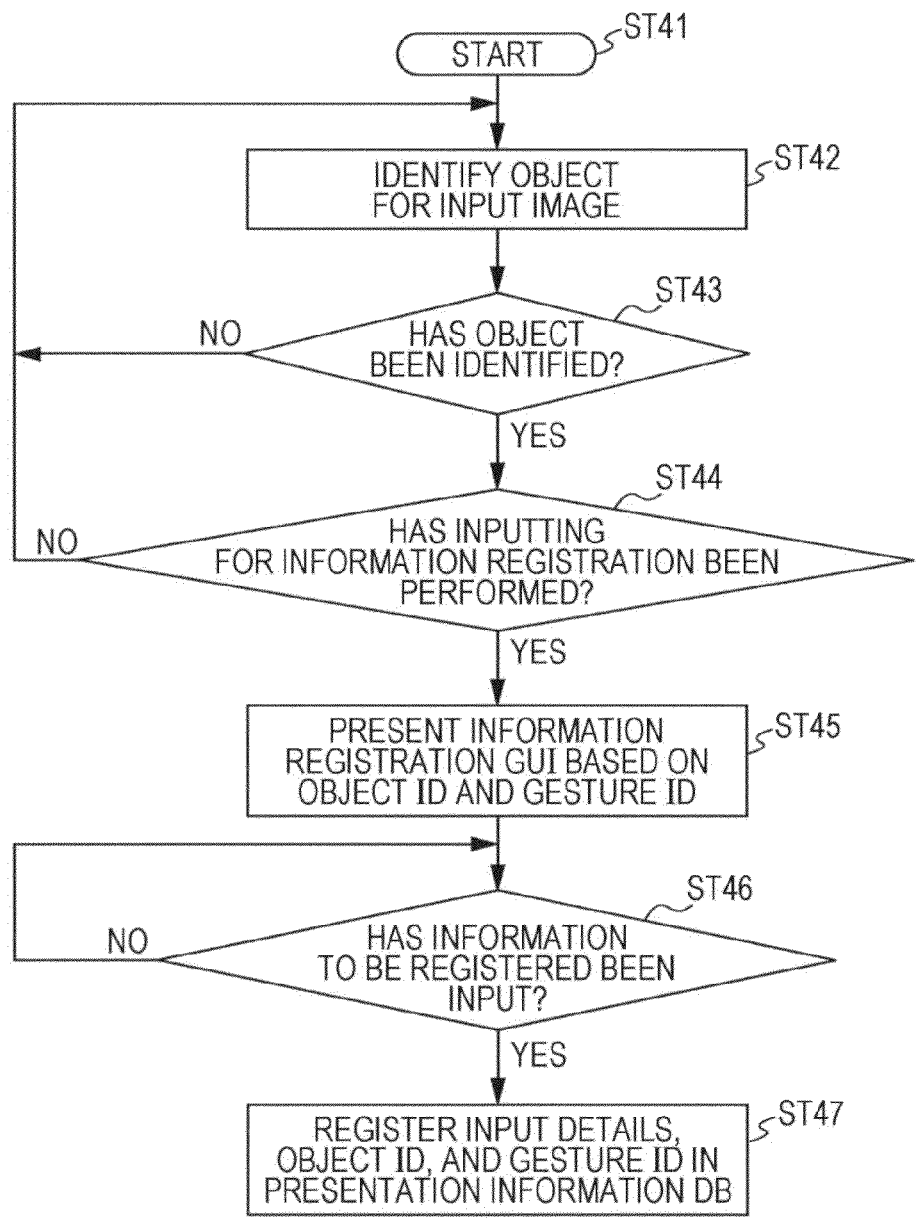

INFORMATION REGISTRATION DEVICE, INFORMATION REGISTRATION METHOD, INFORMATION REGISTRATION SYSTEM, INFORMATION PRESENTATION DEVICE, INFORMATON PRESENTATION METHOD, INFORMATON PRESENTATON SYSTEM, AND PROGRAM

BACKGROUND

The present technology relates to an information registration device, an information registration method, an information registration system, an information presentation device, an information presentation method, an information presentation system, and a program. More particularly, the present technology relates to an information registration device, an information registration method, an information registration system, an information presentation device, an information presentation method, an information presentation system, and a program that perform registration and presentation (viewing) of content information such as images, sound, and text.

In recent years, due to the widespread use of portable information terminals such as cellular phones, viewing of private information including, for example, schedules, notes, and the like, as content information, such as images, sound, and text in an electronic form, has been generally performed. However, significant increases in the amount and type of data, which are caused by computerization of information, have complicated operation on information apparatuses. Thus, it has become difficult to easily fetch desired information.

Meanwhile, due to the development of text-based search methods, by appropriately adding meta-information (a title, a tag, etc.) to information, it has become very easy to fetch desired information on the basis of keywords. However, when different types of meta-information are added to a piece of information, it is difficult to recall appropriate keywords to be used for searching. To this end, user interfaces for registration and viewing of information are to be improved.

Technology for overlaying information on camera-through images using an object recognizing technique is suggested, for example, in Japanese Patent No. 3558104.

SUMMARY

It is desirable to improve the user-friendliness of registration and presentation (viewing) of content information such as images, sound, and text.

A concept of an embodiment of the present technology lies in an information registration device including an object information acquiring unit that acquires object information obtained by performing processing for detecting and identifying an object for image data, and a content information registering unit that registers target content information in a database in association with the object information.

In an embodiment of the present technology, the object information acquiring unit acquires object information obtained by performing processing for detecting and identifying an object for image data. For example, the object information may include meta-information on the object as well as object identification information. The meta-information is, for example, at least one of positional information on the object and attitude information on the object. With a simultaneously localization and mapping (SLAM) technique, an image tracking technique, the value obtained by a gyro sensor, or the like, the above-mentioned information can be corrected and prediction of information can be performed in an undetected state after an object is detected.

In this case, acquiring object information by performing processing for detecting and identifying an object for image data may be performed externally, for example, by a server device that is connected over a network or performed by an object recognizing unit provided in the information registration device. Furthermore, in this case, the image data may be image data stored in a storing unit, such as a semiconductor memory or a hard disk drive, or image data obtained by an image pickup unit (camera) provided in the information registration device.

The content information registering unit registers target content information in the database in association with the object information. In this case, the target content information is content information such as images, sound, and text. In this case, the database may be provided, for example, in the server device that is connected over the network or in the information registration device.

As described above, in an embodiment of the present technology, target content information is registered in the database in association with object information. Thus, a user does not have to consider appropriate search keywords in order to register content information, thus user-friendliness being improved. That is, a user is able to register content information only by performing an operation for capturing an image of a specific object or an operation for selecting image data obtained by capturing a specific object and stored in a storing unit.

Furthermore, in an embodiment of the present technology, for example, the information registration device may further include a user identification information acquiring unit that acquires use identification information obtained by processing for detecting and identifying a user. The content information registering unit may register target content information in the database in association with object information and the user identification information.

In this case, acquiring the user identification information by the processing for detecting and identifying a user may be performed externally, for example, by a server device that is connected over a network or performed by a user recognizing unit provide in the information registration device. The processing for detecting and identifying a user may be performed on the basis of image recognition, such as face recognition, or fingerprint recognition, or on the basis of a user ID and a password manually entered by a user. That is, the processing for detecting and identifying a user may be general processing of user authentication.

In this case, target content information is registered in the database in association with the user identification information as well as the object information. Thus, it is easy to fetch desired content information associated with the user identification information as well as the object information, from the database. That is, content information suitable for a user can be fetched.

Furthermore, in an embodiment of the present technology, for example, the information registration device may further include a registration environmental information acquiring unit that acquires registration environmental information. The content information registering unit may register target content information in the database in association with object information and the registration environmental information. For example, the registration environmental information may include at least one of positional information and time information.

In this case, the registration environmental information may be acquired using a clock unit, a positional information acquiring unit, and the like or may be, for example, externally acquired via a network. The registration environmental information may include weather information, climate information, and the like as well as information acquired by the positional information acquiring unit (latitude and longitude, elevation, velocity, moving direction, etc.) and time information acquired by the clock unit. The registration environmental information may further include user information on a user who can view information, that is, user information on a user who is permitted to view information.

Furthermore, the registration environmental information may also include part or all of the following information: for example, (1) temperature, atmospheric pressure, and humidity, (2) orientation and acceleration, (3) proximity, (4) illuminance, (5) noise, (6) illuminance, (7) noise, (8) date, (9) attitude (six axes), and (10) text. Furthermore, the registration environmental information may include, for example, (11) user's vital data (complexion, body temperature, body mass index (BMI), blood pressure, heart rate, fat mass, basal metabolism, fingerprints, voiceprints, etc.), (12) user's operation (commuting, playing golf, having dinner, cleaning, etc., which may be automatically detected by a sensor or acquired in accordance with a manual operation by a user), (13) sound (may be automatically detected by a sensor or acquired by user's recording), and (14) information viewing history.

In this case, target content information is registered in the database in association with the registration environmental information as well as the object information. Thus, on the basis of the registration environmental information, content information suitable for a viewing environment can be preferentially presented.

Furthermore, another concept of the present technology lies in an information presentation device including an object information acquiring unit that acquires object information obtained by performing processing for detecting and identifying an object for image data, and a content information presenting unit that acquires content information associated with the object information and presents the acquired content information.

In an embodiment of the present technology, the object information acquiring unit acquires object information obtained by performing processing for detecting and identifying an object for image data. For example, the object information may include meta-information on the object as well as object identification information. The meta-information is, for example, at least one of positional information on the object and attitude information on the object. With a SLAM technique, an image tracking technique, the value obtained by a gyro sensor, or the like, the above-mentioned information can be corrected and prediction of information can be performed in an undetected state after an object is detected.

In this case, acquiring object information by performing processing for detecting and identifying an object for image data may be performed externally, for example, by a server device that is connected over a network or performed by an object recognizing unit provided in the information presentation device. Furthermore, in this case, the image data may be image data stored in a storing unit, such as a semiconductor memory or a hard disk drive, or image data obtained by an image pickup unit (camera) provided in the information presentation device.

The content information presenting unit acquires content information associated with the object information and presents the acquired content information. The content information is content information such as images, sound, and text. The content information is, for example, content information registered in advance in a database by a user or content information acquired via a network such as the Internet. Furthermore, in this case, the database may be provided, for example, in a server device that is connected via a network or in the information presentation device.

As described above, in an embodiment of the present technology, content information associated with the object information is acquired and presented. Thus, a user is able to view content information without performing a complicated operation, thus user-friendliness being improved. That is, desired content information can be presented, and a user is able to view the presented information only by performing an operation for capturing an image of a specific object or performing an operation for selecting image data obtained by capturing a specific object and stored in a storing unit.

In an embodiment of the present technology, the information presentation device may further include a user identification information acquiring unit that acquires user identification information obtained by processing for detecting and identifying a user. The content information presenting unit may acquire content information associated with object information and the user identification information and present the acquired content information.

In this case, acquiring the user identification information by the processing for detecting and identifying a user may be performed externally, for example, by a server device that is connected over a network or performed by a user recognizing unit provided in the information presentation device. The processing for detecting and identifying a user may be performed on the basis of image recognition, such as face recognition, or fingerprint recognition, or on the basis of a user ID and a password manually entered by a user. That is, the processing for detecting and identifying a user may be general processing of user authentication.

In this case, content information associated with object information and user identification information is acquired. That is, desired content information associated with the user identification information as well as the object information can be acquired. That is, content information suitable for a user can be fetched.

Furthermore, in an embodiment of the present technology, the information presentation device may further include a viewing environmental information acquiring unit that acquires viewing environmental information. The content information acquired by the content information presenting unit may include registration environmental information added thereto. The content information presenting unit may determine the order in which a specific number of pieces of acquired content information is to be presented, on the basis of the viewing environmental information and the registration environmental information.

In this case, the viewing environmental information may be acquired using a clock unit, a positional information acquiring unit, and the like or may be externally acquired via a network. The viewing environmental information may include weather information, climate information, and the like as well as information acquired by the positional information acquiring unit (latitude and longitude, elevation, velocity, moving direction, etc.) and time information acquired by the clock unit.

Furthermore, the viewing environmental information may also include part or all of the following information: for example, (1) temperature, atmospheric pressure, and humidity, (2) orientation and acceleration, (3) proximity, (4) illuminance, (5) noise, (6) illuminance, (7) noise, (8) date, (9) attitude (six axes), and (10) text. Furthermore, the viewing environmental information may include, for example, (11) user's vital data (complexion, body temperature, BMI, blood pressure, heart rate, fat mass, basal metabolism, fingerprints, voiceprints, etc.), (12) user's operation (commuting, playing golf, having dinner, cleaning, etc., which may be automatically detected by a sensor or acquired in accordance with a manual operation by a user), (13) sound (may be automatically detected by a sensor or acquired by user's recording), and (14) information viewing history.

In this case, the order in which a specific number of pieces of acquired content information are to be presented is determined on the basis of the viewing environmental information. That is, content information suitable for a viewing environment can be preferentially presented.

Furthermore, in an embodiment of the present technology, for example, the information presentation device may further include, for example, an image pickup unit that acquires image data, and a relative positional information acquiring unit that acquires relative positional information on the relative position between an object and the image pickup unit, the relative positional information being obtained by performing processing on the image data. The content information presenting unit may acquire content information associated with object information and the relative positional information and presents the acquired content information.

In this case, content information associated with object information and relative positional information is acquired. That is, desired content information associate with an operation, such as, for example, forming a specific figure, performed with the image pickup unit (camera) as well as object information can be acquired.

According to an embodiment of the present technology, the user-friendliness of registration and presentation (viewing) of content information such as images, sound, and text can be improved.

BRIEF DESCRIPTION OF THE DRAWINGS

FIG. 3 is a flowchart illustrating an example of a process of information registration in the information registration system;

FIG. 18 is a flowchart illustrating an example of a process of information registration in the information registration system.

DETAILED DESCRIPTION OF EMBODIMENTS

Figure 1:
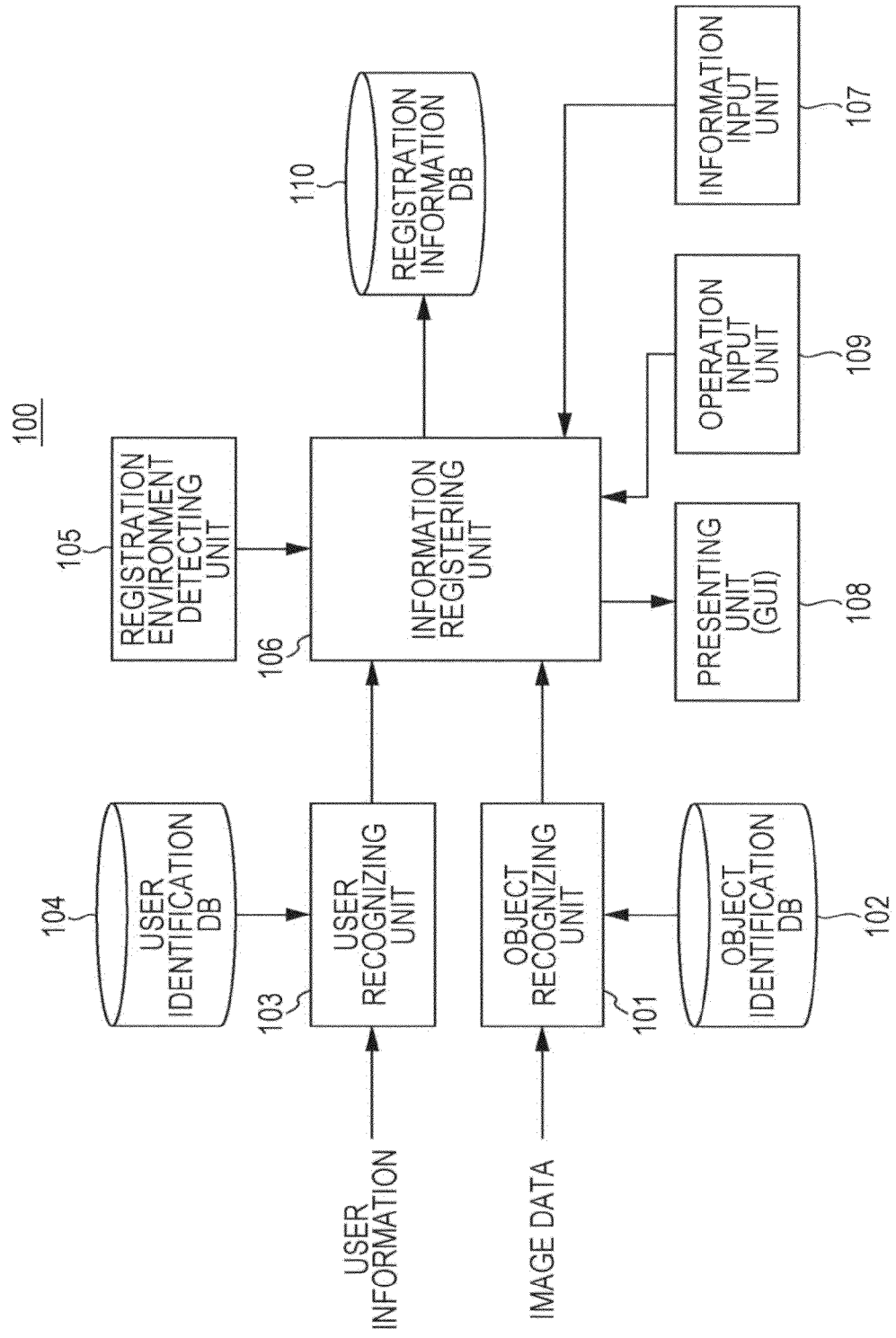
FIG. 1 is a block diagram illustrating an example of the configuration of an information registration system according to a first embodiment of the present technology.

Hereinafter, embodiments implementing the present technology (hereinafter, referred to as "embodiments") will be described. The description will be given in the following order:
1. First Embodiment
2. Second Embodiment
3. Third Embodiment
4. Modifications 1. First Embodiment Information Registration System FIG. 1 illustrates an example of the configuration of an information registration system 100 according to a first embodiment of the present technology. The information registration system 100 includes an object recognizing unit 101, an object identification database 102, a user recognizing unit 103, a user identification database 104, and a registration environment detecting unit 105. The information registration system 100 also includes an information registering unit 106, an information input unit 107, a presenting unit 108, an operation input unit 109, and a registration information database 110.

The object recognizing unit 101 performs processing for detecting and identifying an object for image data and obtains object information, on the basis of object identification data stored in the object identification database 102. The image data used here may be image data stored in a semiconductor memory, a hard disk drive, or the like serving as a storing unit or image data obtained by capturing an image with an image pickup unit (camera). In this case, the common object identification database 102 is used in a system so that an object is not recognized as a different object. Here, objects include human beings and animals.

An object state obtained by the object recognizing unit 101 contains, for example, object identification information (object ID) and information on the position and attitude of an object as meta-information on the object. With a simultaneously localization and mapping (SLAM) technique, an image tracking technique, the value obtained by a gyro sensor, or the like, the above-mentioned information can be corrected and prediction of information can be performed in an undetected state after an object is detected. The object state acquired by the object recognizing unit 101 may include information on the position or the attitude. For example, the object recognizing unit 101 recognizes an object on the basis of the positions of characteristic points of an object contained in an image. Furthermore, the object recognizing unit 101 calculates the position and attitude of an object in a world coordinate system, on the basis of the positions of characteristic points of the object. This positional information includes relative positional information on the relative position between an object and an image pickup unit (camera). The processing performed by the object recognizing unit 101 will not be explained in detail below and is described, for example, in Japanese Unexamined Patent Application Publication No. 2008-304268.

The user recognizing unit 103 performs processing for detecting and identifying a user and obtains user identification information, on the basis of user identification data stored in the user identification database 104. The processing for detecting and identifying a user may be performed on the basis of image recognition, such as face recognition, or fingerprint recognition, or on the basis of a user ID and a password manually entered by a user. That is, the processing for detecting and identifying a user may be general processing of user authentication. In this case, the common user identification database 104 is used in a system so that a user (human being) is not recognized as a different user.

The registration environment detecting unit 105 detects environmental information at the time of registration, from an information registration terminal, the Internet, or the like, which is not illustrated. The environmental information includes, for example, information (latitude and longitude, elevation, velocity, moving direction, etc.) acquired by a positional information acquiring unit, time information acquired by a clock unit, weather information acquired from the Internet, and the like. In this case, the common methods for adjusting time and calculating latitude and longitude are used in a system so that an environment is not recognized as a different environment. The environmental information to be registered may include user information on a user who can view information.

The positional information acquiring unit acquires information (latitude and longitude, elevation, velocity, moving direction, etc.) using a global positioning system (GPS) or wireless fidelity (WiFi) measurement or measurement using a portable base station.

Environmental information may also include part or all of the following information: for example, (1) temperature, atmospheric pressure, and humidity, (2) orientation and acceleration, (3) proximity, (4) illuminance, (5) noise, (6) illuminance, (7) noise, (8) date, (9) attitude (six axes), and (10) text. Furthermore, environmental information may include, for example, (11) user's vital data (complexion, body temperature, body mass index (BMI), blood pressure, heart rate, fat mass, basal metabolism, fingerprints, voiceprints, etc.), (12) user's operation (commuting, playing golf, having dinner, cleaning, etc., which may be automatically detected by a sensor or acquired in accordance with a manual operation by a user), (13) sound (may be automatically detected by a sensor or acquired by user's recording), and (14) information viewing history.

The information registering unit 106 registers content information input from the information input unit 107 in the registration information database 110, in association with the object information, the user identification information, and the registration environmental information mentioned above. The content information is, for example, various types of content information such as images, sound, and text. The information registering unit 106 registers content information of the type selected by the user, in accordance with an operation by the user with the operation input unit 109 using a graphical user interface (GUI) displayed on the presenting unit 108.

In this case, the user may be able to select a type of environmental information that is to be linked with content information to be registered. For example, in the case where positional information, time information, and weather information are acquired by the registration environment detecting unit 105, only the positional information and the time information can be selected as environmental information to be linked with content information to be registered.

Figure 2A:
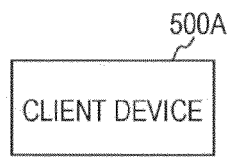
FIG. 2A is a diagram for explaining that a system includes only a client device.
Figure 2B:
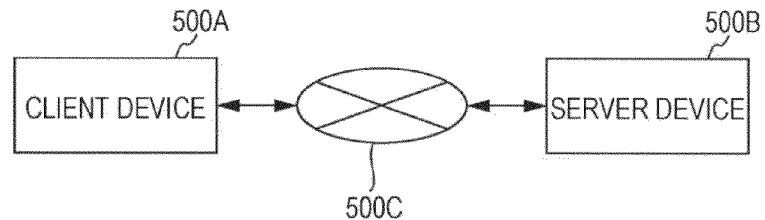
FIG. 2B is a diagram for explaining that the system is a network system including the client device and a server device that are connected over a network.

The information registration system 100 illustrated in FIG. 1 can be, for example, a client device 500A illustrated in FIG. 2A or a network system illustrated in FIG. 2B including the client device 500A and a server device 500B that are connected over a network 500C. In the case of the network system illustrated in FIG. 2B, units forming the information registration system 100 are appropriately allocated in a distributed manner to the client device 500A and the server device 500B. For example, the object recognizing unit 101, the object identification database 102, the user recognizing unit 103, the user identification database 104, part of the registration environment detecting unit 105, and the registration information database 110 can be allocated to the server device 500B.

An example of a process for performing information registration by the information registration system 100 illustrated in FIG. 1 will now be explained with reference to a flowchart illustrated in FIG. 3. In step ST1, the information registration system 100 starts the process. Then, the information registration system 100 proceeds to processing of step ST2. In step ST2, the user recognizing unit 103 performs processing for detecting and identifying a user and obtains user identification information, on the basis of input user information (a face image, a fingerprint image, manually input information on an account and a password of the user, etc.).

In step ST3, the object recognizing unit 101 performs processing for detecting and identifying an object for input image data, and obtains object information. In this processing, for example, the user captures an image of a specific object with an image pickup unit (camera) attached to the client device 500A and obtains input image data. Alternatively, for example, the user selects image data stored in a storing unit of the client device 500A and obtains input image data.

In step ST4, the presenting unit 108 presents the target (object) identified in step ST3 for which information can be registered. In step ST5, the information registration system 100 determines whether or not an operation for selecting the target presented in step ST4 has been performed by the user. The user is able to perform an operation for selection by operating the operation input unit 109.

When an operation for selection has been performed by the user, the information registration system 100 proceeds to step ST6. In step ST6, the presenting unit 108 presents a type of content information that can be input. For example, in the case where any of images, sound, and text can be input, the presenting unit 108 presents a message indicating that any of images, sound, and text can be input. In step ST7, the information registration system 100 determines whether or not the presented type of content information has been input. The user is able to input desired content information using the information input unit 107.

When content information is input, the presenting unit 108 presents a registration environment detected by the registration environment detecting unit 105 in step ST8. In step ST9, the information registration system 100 determines whether or not an operation for selecting the presented environment has been performed. The user is able to perform an operation for selection by operating the operation input unit 109.

When an operation for selection has been performed by the user, the information registration system 100 proceeds to processing of step ST10. In step ST10, the information registering unit 106 registers the content information input in step ST7 for the target (object) selected in step ST5. That is, the information registering unit 106 registers the content information in the registration information database 110, in association with the target (object). In this processing, the content information is also associated with the user identification information and the registration environmental information selected in step ST9. After the processing of step ST10, the information registration system 100 terminates the process in step ST11.

As described above, in the information registration system 100 illustrated in FIG. 1, target content information is registered in the registration information database 110, in association with object information. Thus, the user is able to register content information without considering an appropriate search keyword, thus user-friendliness being improved. That is, the user is able to register content information only by performing an operation for capturing an image of a specific object or performing an operation for selecting image data stored in a storing unit and obtained by capturing an image of a specific object.

Furthermore, in the information registration system 100 illustrated in FIG. 1, target content information is registered in the registration information database 110, in association with the user identification information as well as the object information. Thus, it is easy to fetch desired content information associated with user identification information as well as object information, from the registration information database 110. That is, content information suitable for a user can be fetched.

Furthermore, in the information registration system 100 illustrated in FIG. 1, target content information is registered in the registration information database 110, in association with registration environmental information as well as object information. Thus, on the basis of the registration environmental information, content information suitable for a viewing environment can be preferentially presented.

2. Second Embodiment

Information Presentation System

Figure 4:
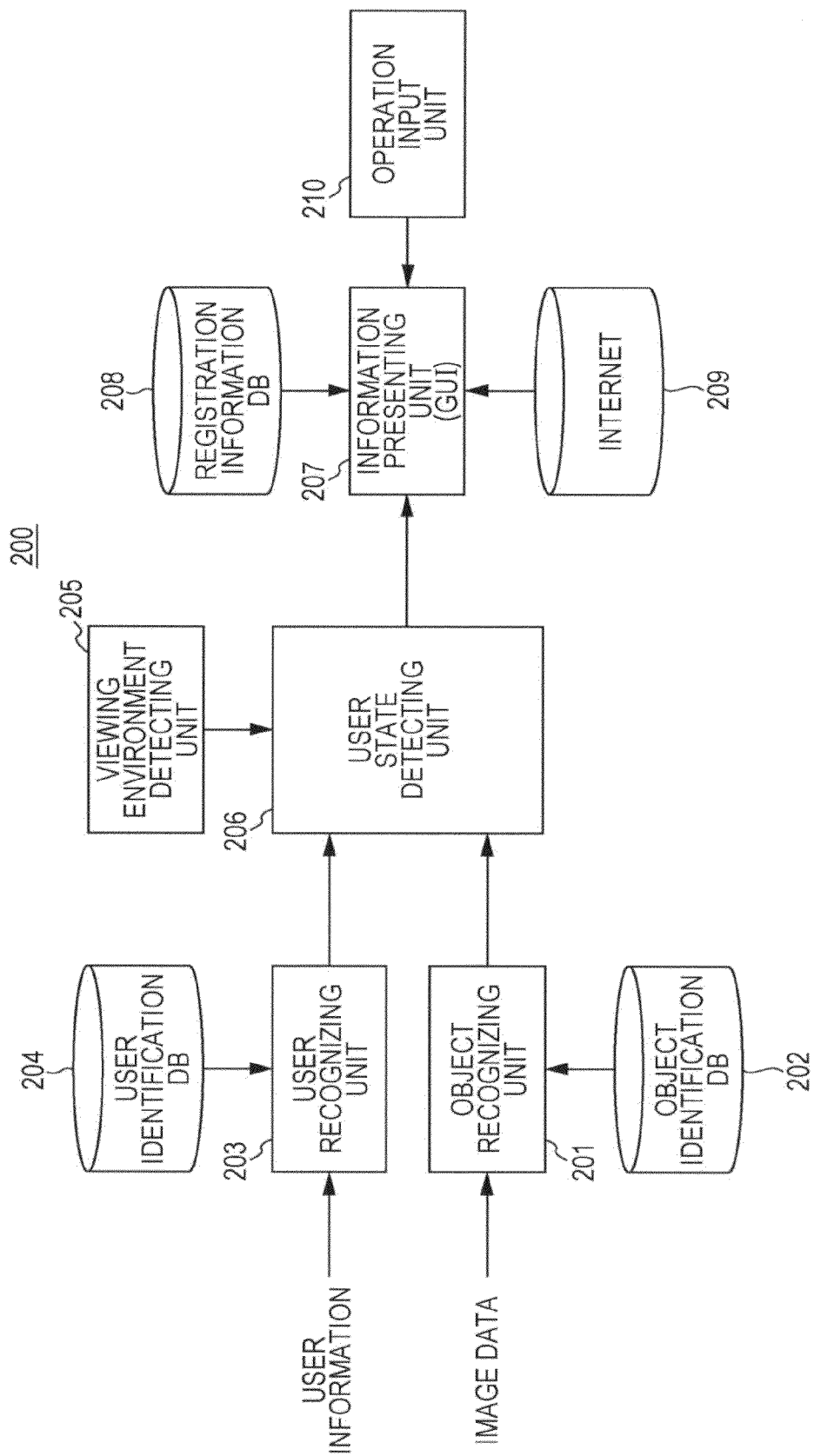
FIG. 4 is a block diagram illustrating an example of the configuration of an information presentation system according to a second embodiment of the present technology.

FIG. 4 illustrates an example of the configuration of an information presentation system 200 according to a second embodiment of the present technology. The information presentation system 200 includes an object recognizing unit 201, an object identification database 202, a user recognizing unit 203, a user identification database 204, and a viewing environment detecting unit 205. The information presentation system 200 also includes a user state detecting unit 206, an information presenting unit 207, a registration information database 208, the Internet 209, and an operation input unit 210.

The object recognizing unit 201 performs processing for detecting and identifying an object for image data and obtains object information, on the basis of object identification data stored in the object identification database 202. The image data used here may be image data stored in a semiconductor memory, a hard disk drive, or the like serving as a storing unit or image data obtained by capturing an image with an image pickup unit (camera). In this case, the common object identification database 202 is used in a system so that an object is not recognized as a different object. Here, objects include human beings and animals.

An object state obtained by the object recognizing unit 201 contains, for example, object identification information (object ID) and information on the position and attitude of an object as meta-information on the object. With a SLAM technique, an image tracking technique, the value obtained by a gyro sensor, or the like, the above-mentioned information can be corrected and prediction of information can be performed in an undetected state after an object is detected. The object state acquired by the object recognizing unit 201 may be information on the position or the attitude. For example, the object recognizing unit 201 recognizes an object on the basis of the positions of characteristic points of an object contained in an image. Furthermore, the object recognizing unit 201 calculates the position and attitude of an object in a world coordinate system, on the basis of the positions of characteristic points of the object. This positional information includes relative positional information on the relative position between an object and an image pickup unit (camera). The processing performed by the object recognizing unit 201 will not be explained in detail below and is described, for example, in Japanese Unexamined Patent Application Publication No. 2008-304268.

The user recognizing unit 203 performs processing for detecting and identifying a user and obtains user identification information, on the basis of user identification data stored in the user identification database 204. The processing for detecting and identifying a user may be performed on the basis of image recognition, such as face recognition, or fingerprint recognition, or on the basis of a user ID and a password manually entered by a user. That is, the processing for detecting and identifying a user may be general processing of user authentication. In this case, the common user identification database 204 is used in a system so that a user (human being) is not recognized as a different user.

The viewing environment detecting unit 205 detects environmental information at the time of viewing, from an information registration terminal, the Internet, or the like, which is not illustrated. The environmental information includes, for example, information (latitude and longitude, elevation, velocity, moving direction, etc.) acquired by a positional information acquiring unit, time information acquired by a clock unit, information acquired from the Internet, and the like. In this case, the common methods for adjusting time and calculating latitude and longitude are used in a system so that an environment is not recognized as a different environment.

The positional information acquiring unit acquires information (latitude and longitude, elevation, velocity, moving direction, etc.) using a GPS or WiFi measurement or measurement using a portable base station.

Environmental information may also include part or all of the following information: for example, (1) temperature, atmospheric pressure, and humidity, (2) orientation and acceleration, (3) proximity, (4) illuminance, (5) noise, (6) illuminance, (7) noise, (8) date, (9) attitude (six axes), and (10) text. Furthermore, environmental information may include, for example, (11) user's vital data (complexion, body temperature, BMI, blood pressure, heart rate, fat mass, basal metabolism, fingerprints, voiceprints, etc.), (12) user's operation (commuting, playing golf, having dinner, cleaning, etc., which may be automatically detected by a sensor or acquired in accordance with a manual operation by a user), (13) sound (may be automatically detected by a sensor or acquired by user's recording), and (14) information viewing history.

The user state detecting unit 206 generates an information search query, on the basis of object identification information, user identification information, viewing environmental information, and the like. For example, the information search query is generated in order to present content information associated with object identification information and user identification information included in object information, in the order based on viewing environmental information (time information, positional information, etc.).

The information presenting unit 207 acquires content information from the registration information database 208, on the basis of the information search query generated by the user state detecting unit 206. The information presenting unit 207 also acquires associated information from the Internet 209 and presents the acquired information. In this case, when a plurality of pieces of information are acquired, information to be presented is switched automatically in accordance with the priority of information or by a switching operation by a user using the operation input unit 210. In this case, for example, the operation input unit 210 may include a touch sensor or an acceleration sensor. Associated information may not be acquired from the Internet 209.

The information presentation system 200 illustrated in FIG. 4 can also be, for example, the client device 500A illustrated in FIG. 2A or the network system illustrated in FIG. 2B including the client device 500A and the server device 500B that are connected over the network 500C. In the case of the network system illustrated in FIG. 2B, units forming the information presentation system 200 are appropriately allocated in a distributed manner to the client device 500A and the server device 500B. For example, the object recognizing unit 201, the object identification database 202, the user recognizing unit 203, the user identification database 204, part of the viewing environment detecting unit 205, and the registration information database 208 can be allocated to the server device 500B.

Figure 5:
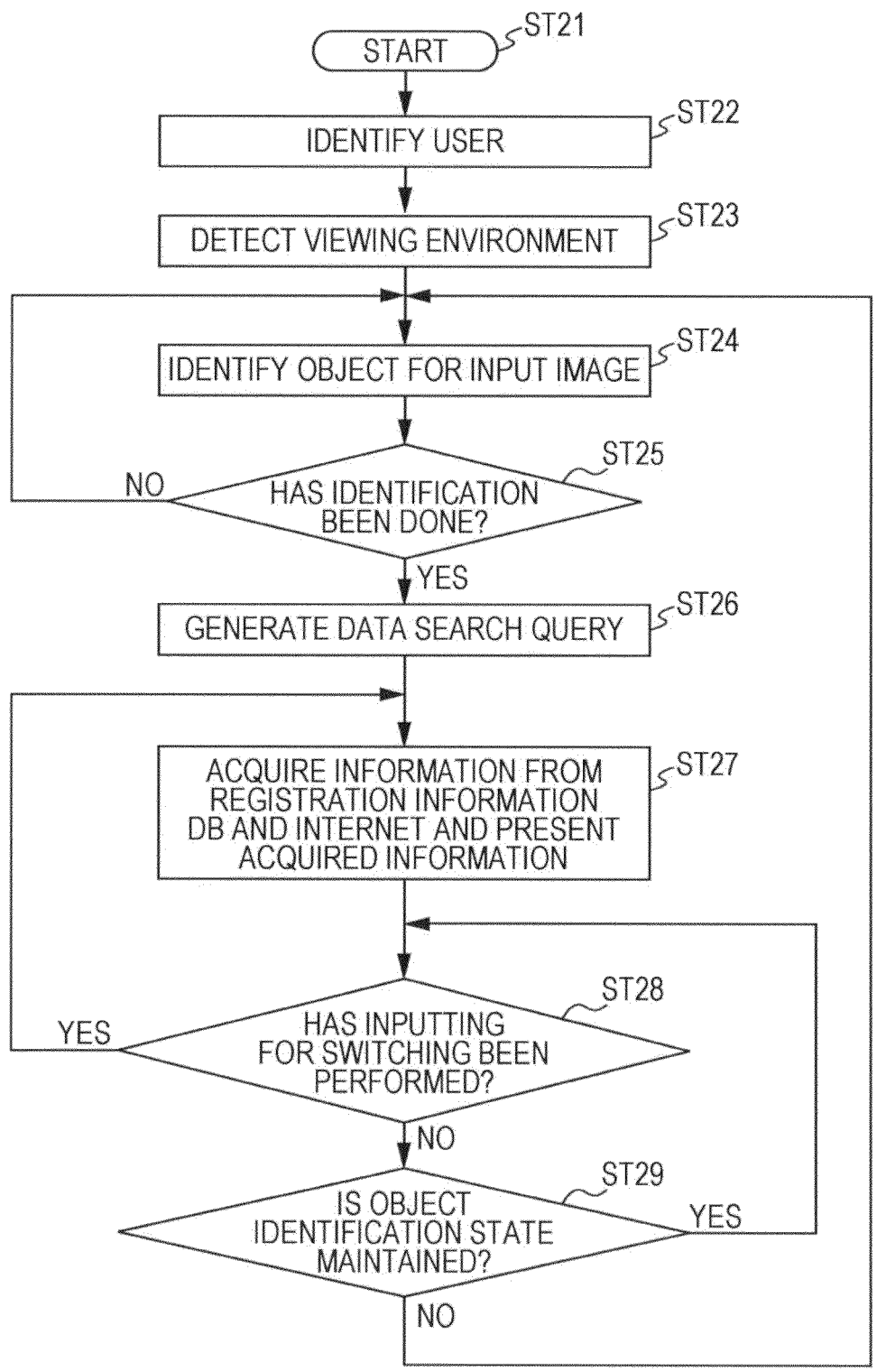
FIG. 5 is a flowchart illustrating an example of a process of information presentation in the information presentation system.

An example of a process for performing information presentation by the information presentation system 200 illustrated in FIG. 4 will now be explained with reference to a flowchart illustrated in FIG. 5. In step ST21, the information presentation system 200 starts the process, for example, when the power is turned on. Then, the information presentation system 200 proceeds to processing of step ST22. In step ST22, the user recognizing unit 203 performs processing for detecting and identifying a user and obtains user identification information, on the basis of input user information (a face image, a fingerprint image, manually input information on an account and a password of the user, etc.).

In step ST23, the viewing environment detecting unit 205 detects environmental information at the time of viewing, such as positional information (latitude and longitude information), time information, and the like, from an information registration terminal, the Internet, or the like, which is not illustrated. Then, the information presentation system 200 proceeds to step ST24.

In step ST24, the object recognizing unit 201 performs processing for detecting and identifying an object for input image data, and obtains object information. In this processing, for example, the user captures an image of a specific object with an image pickup unit (camera) attached to the client device 500A and obtains input image data. Alternatively, for example, the user selects image data stored in a storing unit of the client device 500A and obtains input image data.

In step ST25, the information presentation system 200 determines whether or not an object has been identified. When an object has been identified, in step ST26, the user state detecting unit 206 generates an information search query, on the basis of the object identification information, the user identification information, the viewing environmental information, and the like. For example, the information search query is generated in order to present content information associated with object identification information and user identification information included in object information, in accordance with the order based on viewing environmental information (time information, positional information, etc.).

In step ST27, the information presenting unit 207 acquires information from the registration information database 208 and the Internet 209 on the basis of the information search query generated in step ST26, and presents the acquired information. In this case, content information registered in association with the object identification information and the user identification information is acquired from the registration information database 208. Here, for example, even if user identification information does not match the information search query, when the user identification information is within an allowable range (for example, relatives, friends, etc.) for user information on a user who can view information included in environmental information at the time of registration, corresponding content information is acquired. Furthermore, in this case, associated information is acquired from the Internet 209.

In step ST28, the information presentation system 200 determines whether or not an operation for switching has been performed. An operation for switching is, for example, performed in accordance with a switching operation performed by the user using the operation input unit 210 or performed automatically after a certain period of time has passed. When an operation for switching has been performed, the information presenting unit 207 acquires information in the next place in the presentation order from the registration information database 208 and the Internet 209 and presents the acquired information in step ST27. When only one piece of information is to be presented, the information is continued to be presented. When an operation for switching is performed while the information in the last place in the presentation order of a plurality of pieces of information to be presented is being presented, switching to presentation of the information in the first place in the presentation order is performed.

When an operation for switching has not been performed in step ST28, the information presentation system 200 determines whether or not the object identification state where the object is identified, the state being entered in step ST25, is maintained in step ST29. When the object identification state is maintained, the information presentation system 200 returns to the processing of step ST28. When the object identification state is not maintained, the information presentation system 200 returns to the processing of step ST24, and repeats processing similar to the processing described above.

For example, when a user cancels the state where an image of an object is being captured and the system enters the state where an image of a different object is being captured, the object identification state is interrupted. Thus, the process returns to the processing of step ST24. When the object identification state is not maintained, the process may not return to the processing of step ST24 until the user performs an explicit operation. The information presentation system 200 terminates the process, for example, when the power is turned off.

SPECIFIC EXAMPLES

Specific examples will now be described. Here, an example of information viewing at the time of visiting a destination, an example of a reputation viewing system, and an example of a bulletin board system will be explained as a first example, a second example, and a third example, respectively.

First Example

Information Viewing at the Time of Visiting a Destination

When visiting a destination, a user wants to quickly acquire desired information. In such a situation, a system in which "attachment of information" and "fetching of information" can be performed for an object (item) that is carried with a user when the user visits somewhere is implemented, using the information registration system 100 illustrated in FIG. 1 and the information presentation system 200 illustrated in FIG. 4.

Figure 6:
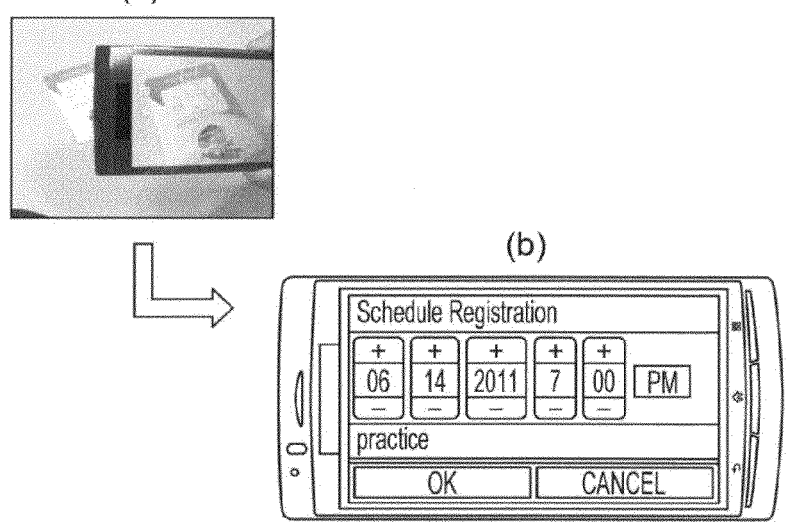
FIG. 6 includes diagrams for explaining an example of information viewing at the time of visiting a destination as a specific example.
Figure 7:
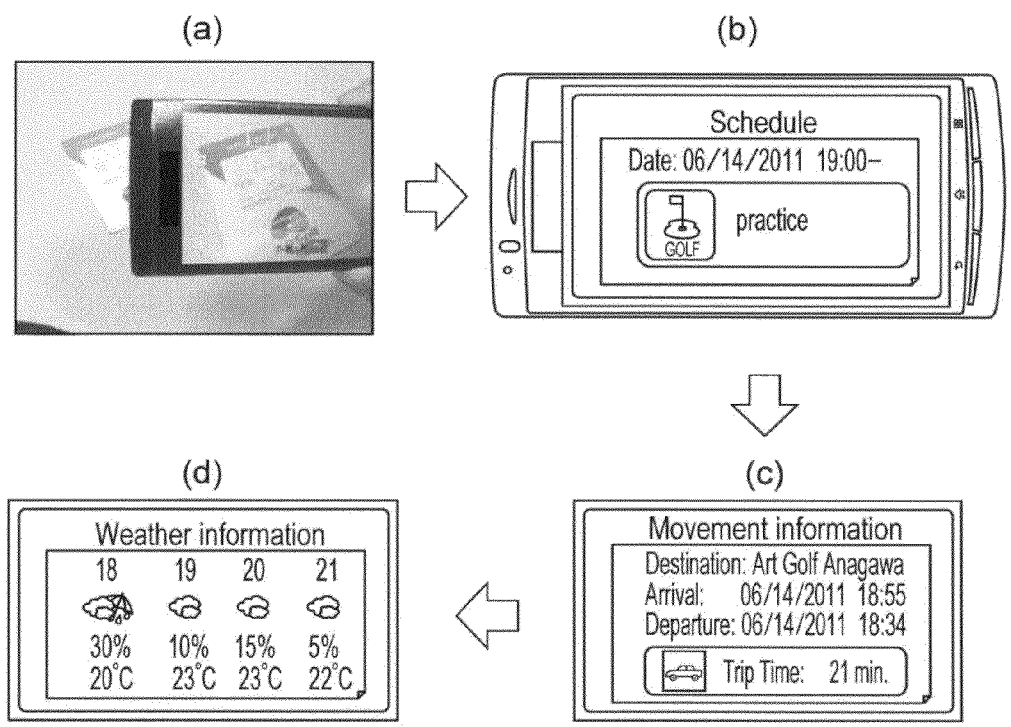
FIG. 7 includes diagrams for explaining an example of information viewing at the time of visiting a destination as a specific example.

In this example, an information terminal such as a cellular phone that is capable of accessing the Internet and that includes a camera (image pickup unit) is assumed. After the user holds the information terminal over a target and captures an image of the object in advance as illustrated in part (a) of FIG. 6, information on a visit is registered, as illustrated in part (b) of FIG. 6. Then, when the user holds the information terminal over the target as illustrated in part (a) of FIG. 7, information is presented, as illustrated in parts (b) to (d) of FIG. 7.

At this time, information search is performed for the registration information database 208 on the basis of identification results obtained by the object recognizing unit 201 and the user recognizing unit 203. Furthermore, not only is registered information displayed, information to be used for the visit is also acquired from the Internet and presented. Information to be presented is switched in accordance with a user operation through a touch sensor or an acceleration sensor or after a certain period of time has passed.

In addition, the order of presentation is controlled on the basis of ordering of information performed by the user state detecting unit 206. For example, the ordering is done on the basis of the priority calculated for each piece of information, using equation (1):

$$V = a_0 \cdot D_0(t) + a_1 \cdot D_1(x,y) \quad (1),$$

where $D_0(t)$ represents the time to a scheduled time, $D_1(x, y)$ represents the distance to a destination, and $a_0$ and $a_1$ each represent a coefficient.

In equation (1), "the time to a scheduled time" and "the distance to a destination" are normalized on the basis of viewing environment at the time of presentation of information, and the priority V is calculated. In a display example illustrated in FIG. 7, on the basis of the priority V, "Schedule", "Movement Information", and "Weather Information" are displayed in that order. Here, information can be attached to various objects (items) such as a golf membership card to be used when going to a golf driving range, a patient's registration card to be used when seeing a doctor, a staff identity card to be used when going to office, and the like.

Second Example

Reputation Viewing System

When considering whether to buy confectionery, a toy, or the like, a user wants to easily register and view reputations for a target. In such a situation, a system in which "attaching of information" and "fetching of information" can be performed for a target is implemented, using the information registration system 100 illustrated in FIG. 1 and the information presentation system 200 illustrated in FIG. 4.

In this example, an information terminal such as a cellular phone that is capable of accessing the Internet and that includes a camera (image pickup unit) is assumed. Basically, the same system as that used in the first example is implemented. The system used in the second example is different from the system used in the first example in behavior of the user state detecting unit 206. In the first example, a user identification result is used only when information search is performed. In the second example, however, a user identification result is used for calculating the priority V, as in equation (2):

$$V = a_0 \cdot D_0(t) + a_1 \cdot D_1(x,y) + a_2 \cdot D_2(n) \quad (2),$$

where "$D_0(t)$" represents the time to the information registration time, "$D_1(x, y)$" represents the distance to the information registration place, "$D_2(n)$" represents the distance between users who register information, and "$a_0$", "$a_1$", and "$a_2$" each represent a coefficient.

For example, the weighting sum of differences in a value, such as age, sex, annual income, BMI, or the like, is normalized. Accordingly, a user is able to easily view information registered by various people in accordance with the importance, only by holding the information terminal over a target. This example can be applied not only to purchase of confectionery but also to various cases where selection of any item is performed. Furthermore, the second example is also applied to a case where an item seller or the like registers campaign information or the like. In the case of Twitter or the like, time line display or the like based on the relationship among people, such as followers, is available. In this example, however, information is presented on the basis of an object.

Third Example

Bulletin Board System

In the situation of getting together in a large group, users want to leave messages in a particular place. Message boards at stations have drawbacks in that, for example, the general public see messages, message boards are available only limited places, and it is difficult for a user to discriminate information related to the user from a large volume of information provided by many people. In such a situation, a bulletin board system that can solve the above-mentioned drawbacks and that can be installed in a desired place is implemented, using the information registration system 100 illustrated in FIG. 1 and the information presentation system 200 illustrated in FIG. 4.

This bulletin board system can be accessed from a normal web browser. After logging in, a user selects a mark registered in advance in a system, the mark being presented together with a place where the mark is located, and selects and registers target information together with the relative position and rotation information for the mark. At this time, restriction on viewing of the information can also be set.

For restriction on viewing, setting may be performed such that registered information can be viewed only when a gesture of forming a triangle is performed in front of the mark. Accordingly, filtering of information can be performed, using the gesture, for a large volume of information registered for the mark by the user or a third party.

With this system, for example, since information can be registered when a user stays at the user's home, the user can use this system in such a manner that the user selects the loyal dog Hachi-Ko in front of Shibuya Station as a meeting place for a drinking party and registers as information, in a space on the slightly right of a bronze plate with the words "the loyal dog Hachi-Ko", the place where the drinking party is held and the map of the place.

This bulletin board system can be accessed from an information terminal such as a cellular phone including a camera (image pickup unit). That is, by capturing an image of a mark registered in advance in the system, a user is able to view information registered for the mark. At this time, information that is suitable for the current state of the user is preferentially presented from among various types of information registered in association with the state of the user. Furthermore, by performing a gesture of forming a particular shape, such as a triangle or a pentagram, in front of a mark for presented information, switching, filtering, and the like of information can be performed.

Accordingly, for example, in the case where a user registers information for a bronze plate in front of the loyal dog Hachi-Ko when the user is at home, by actually visiting the site, capturing an image of the bronze plate with a camera, and performing a gesture of forming a triangle, the user is able to view information. In this case, the user is able to view information when the user knows which gesture the user should perform in front of a mark. Thus, people who are supposed to get together can access the information if they know the mark and the gesture in advance. If a person who does not know the mark and the gesture, it is difficult for the person to access the information. Accordingly, a function of enabling only a desired person to view information can be easily implemented.

In addition, in this bulletin board system, information can be registered using a portable terminal. That is, after capturing an image of a mark registered in advance in the system, by calling an information registration GUI and performing operation on the information registration GUI, a user is able to register information. Thus, for example, in the case of registering information for the above-mentioned meeting place, the user is able to register as a note, on the lower right or the like of the bronze plate with the words "the loyal dog Hachi-Ko", information indicating that the user has already arrived at the meeting place and the user is going ahead first to the drinking party site.

Figure 8:
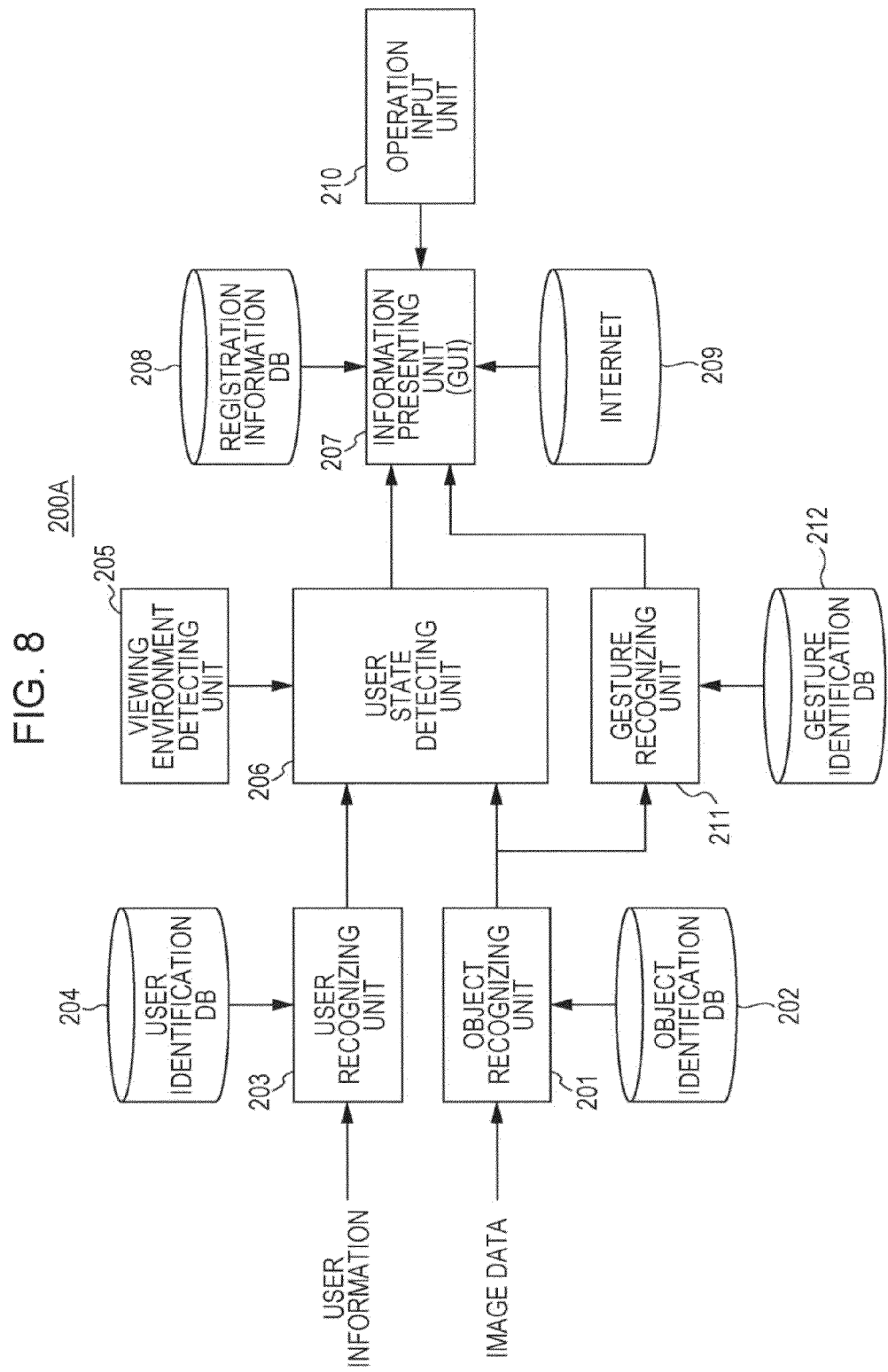
FIG. 8 is a block diagram illustrating another example of the configuration of an information presentation system.

An information presentation system 200A illustrated in FIG. 8 includes a gesture recognizing unit 211, so as to support the third example described above. In FIG. 8, parts corresponding to those in FIG. 4 are referred to with the same reference numerals and the description of those parts will be omitted.

The gesture recognizing unit 211 performs processing for detecting and identifying a gesture for positional information of an object output from the object recognizing unit 201, on the basis of gesture identification data stored in a gesture identification database 212, and obtains gesture identification information. Here, object positional information includes relative positional information on the relative position between an object and a camera (image pickup unit).

The information presenting unit 207 acquires information from the registration information database 208 and the Internet 209, on the basis of an information search query and gesture identification information from the user state detecting unit 206, and presents the acquired information. Although not explained in detail, the other parts of the information presentation system 200A are configured similarly to those of the information presentation system 200 illustrated in FIG. 4.

In the description provided above, content information such as images, sound, and text is registered in the registration information database 208, in association with object identification information. The information presenting unit 207 acquires, from the registration information database 208, content information associated with object identification information, and displays the acquired content information.

Figure 9:
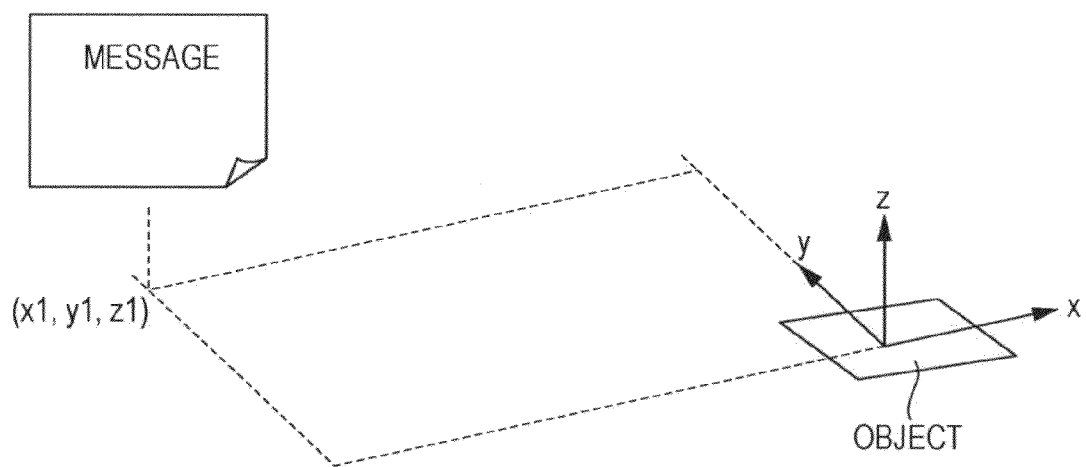
FIG. 9 is a diagram for explaining an example in which information on the position (x, y, z) and the rotation (roll, pitch, yaw) of an object as well as object identification information is used.

However, for example, a user may want to register content information in the registration information database 208, in association with the position (x, y, z) and the rotation (roll, pitch, yaw) for an object, as well as object identification information. With the information registration system 100 illustrated in FIG. 1, such information can be registered. FIG. 9 illustrates that message information is registered for a position (x1, y1, z1), which is away from the position where an object is located.

Figure 10:
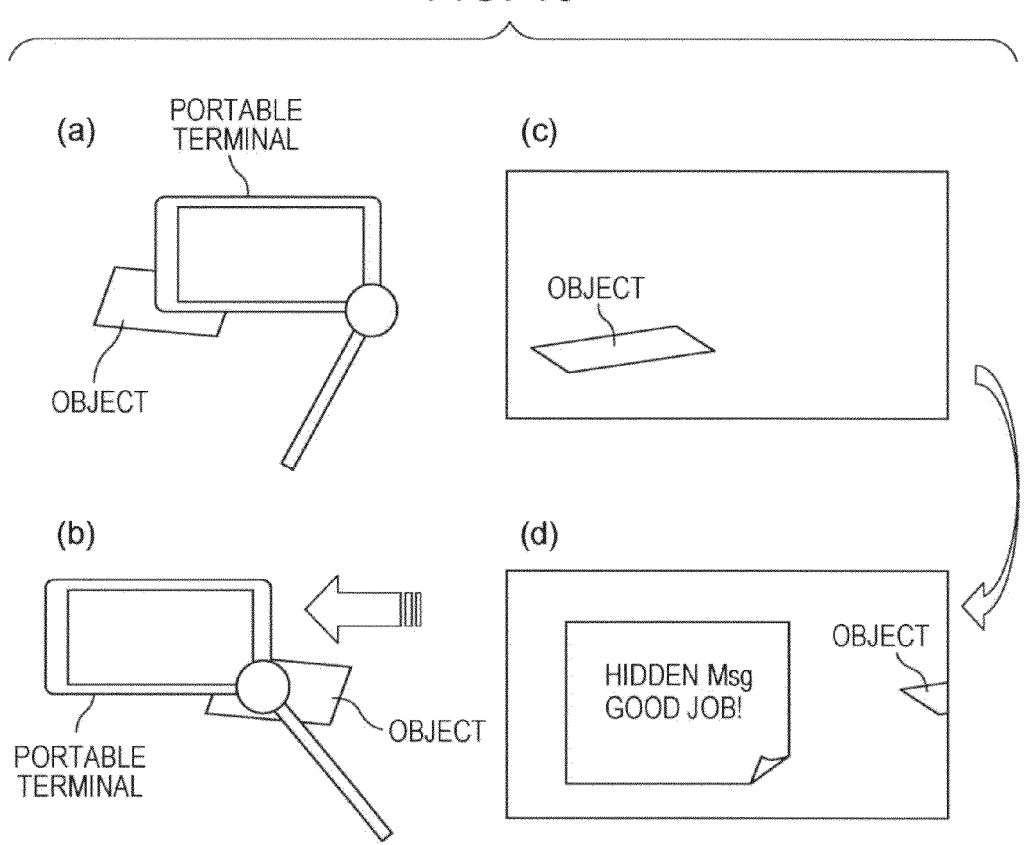
FIG. 10 includes diagrams for explaining an example in which information on the position (x, y, z) and the rotation (roll, pitch, yaw) of an object as well as object identification information is used.

In this case, in the information presentation system 200 (for example, a portable terminal), when the image pickup position is moved from a position illustrated in part (a) of FIG. 10 to a position illustrated in part (b) of FIG. 10, an object is moved out of the frame of a camera, as illustrated in part (c) to (d) of FIG. 10. With this operation, message information associated with the position (x1, y1, z1) can be acquired from the registration information database 208, as described above. Accordingly, hidden message information can be displayed, as illustrated in part (d) of FIG. 10.

As described above, in the information presentation system 200 illustrated in FIG. 4, content information associated with object information (object identification information) is acquired from the registration information database 208, and the acquired content information is presented. Thus, a user is able to view content information without performing a complicated operation, thus user-friendliness being improved. That is, desired content information can be presented to the user, and the user is able to view the presented information only by performing an operation for capturing an image of a specific object or selecting image data obtained by capturing an image of a specific object and stored in a storing unit.

Furthermore, in the information presentation system 200 illustrated in FIG. 4, content information associated with object information and user identification information can be acquired from the registration information database 208. That is, desired content information associated with user identification information as well as object information can be acquired. Namely, content information suitable for a user can be fetched.

Furthermore, in the information presentation system 200 illustrated in FIG. 4, the order in which a specific number of pieces of acquired content information is to be presented can be determined on the basis of viewing environmental information (positional information, time information, etc.). That is, in the case of presenting content information, content information suitable for a viewing environment can be preferentially presented.

3. Third Embodiment

Information Presentation System

Figure 11:
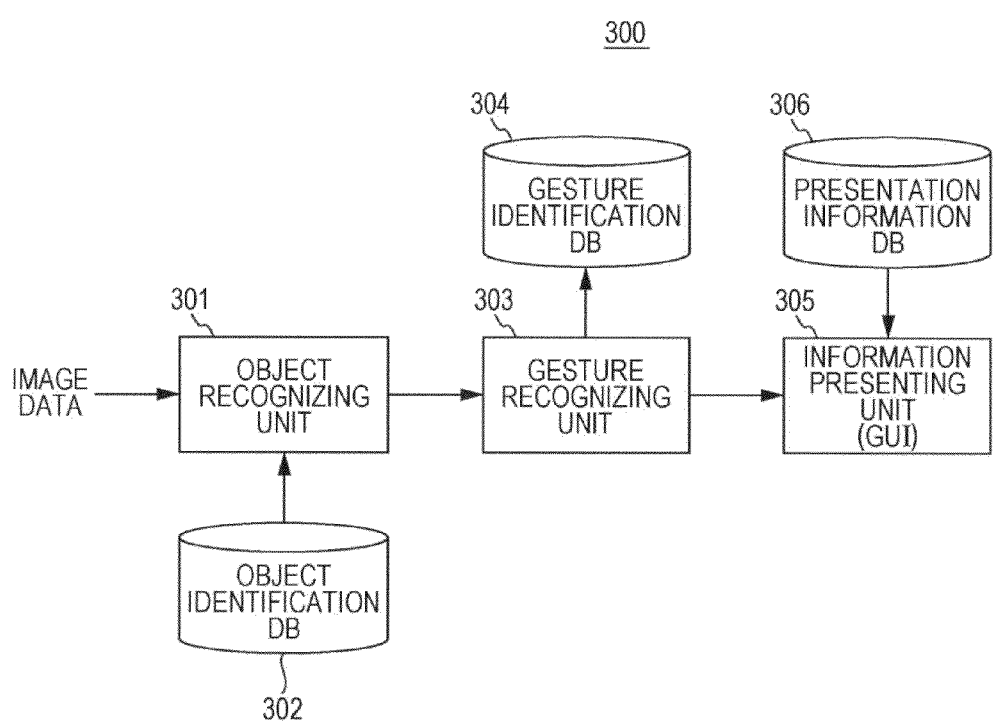
FIG. 11 is a block diagram illustrating an example of the configuration of an information presentation system according to a third embodiment of the present technology.

FIG. 11 illustrates an example of the configuration of an information presentation system 300 according to a third embodiment of the present technology. The information presentation system 300 includes an object recognizing unit 301, an object identification database 302, a gesture recognizing unit 303, a gesture identification database 304, an information presenting unit 305, and a presentation information database 306.

The object recognizing unit 301 performs processing for detecting and identifying an object for image data and obtains object information, on the basis of object identification data stored in the object identification database 302. The image data used here may be image data obtained by capturing an image with an image pickup unit (camera) or image data stored in a semiconductor memory, a hard disk drive, or the like serving as a storing unit. In this case, the common object identification database 302 is used in a system so that an object is not recognized as a different object. Here, objects include human beings and animals.

An object state acquired by the object recognizing unit 301 includes, for example, object identification information (object ID) and positional information on a camera (image pickup unit) relative to the object. The camera positional information is based on, for example, the position of the object, and serves as relative positional information on the relative position between the object and the camera. The object recognizing unit 301 recognizes an object on the basis of, for example, positions of characteristic points of the object contained in an image.

The object recognizing unit 301 also calculates, on the basis of the positions of the characteristic points of the object, for example, the position of the camera (image pickup unit) relative to the object. That is, the object recognizing unit 301 calculates the position of the camera on the basis of how the object (target) appears in the image and on the basis of the actual size of the object described in a recognition dictionary registered in advance in the object identification database 302. The processing by the object recognizing unit 301 will not be explained in detail below and is described, for example, in Japanese Unexamined Patent Application Publication No. 2008-304268 by this applicant.

The gesture recognizing unit 303 performs processing for detecting and identifying a gesture for the camera positional information output from the object recognizing unit 301 and obtains gesture identification information (gesture ID), on the basis of gesture identification data stored in the gesture identification database 304. The gesture identification information includes certainty information added thereto, representing the degree of certainty. That is, the gesture recognizing unit 303 compares the position or track of the camera positional information with gesture identification data, and calculates and outputs the closest gesture identification information and certainty information of the gesture identification.

The information presenting unit 305 acquires content information, such as images, sound, or text, associated with object identification information and gesture identification information, on the basis of the object identification information, the gesture identification information, and certainty information, and presents the acquired content information. In this processing, if the degree of certainty of gesture identification is smaller than or equal to a specific value, the information presenting unit 305 presents a plurality of pieces of information associated with the object identification information and waits to receive input of a gesture. Gesture recognition performed here may be replaced by touch point or button operation and may be a partially or uniformly hybrid operation.

The information presentation system 300 illustrated in FIG. 11 can also be, for example, the client device 500A illustrated in FIG. 2A or the network system illustrated in FIG. 2B including the client device 500A and the server device 500B that are connected over the network 500C. In the case of the network system illustrated in FIG. 2B, units forming the information presentation system 300 are appropriately allocated in a distributed manner to the client device 500A and the server device 500B. For example, the object recognizing unit 301, the object identification database 302, the gesture recognizing unit 303, the gesture identification database 304, and the presentation information database 306 can be allocated to the server device 500B.

Figure 12:
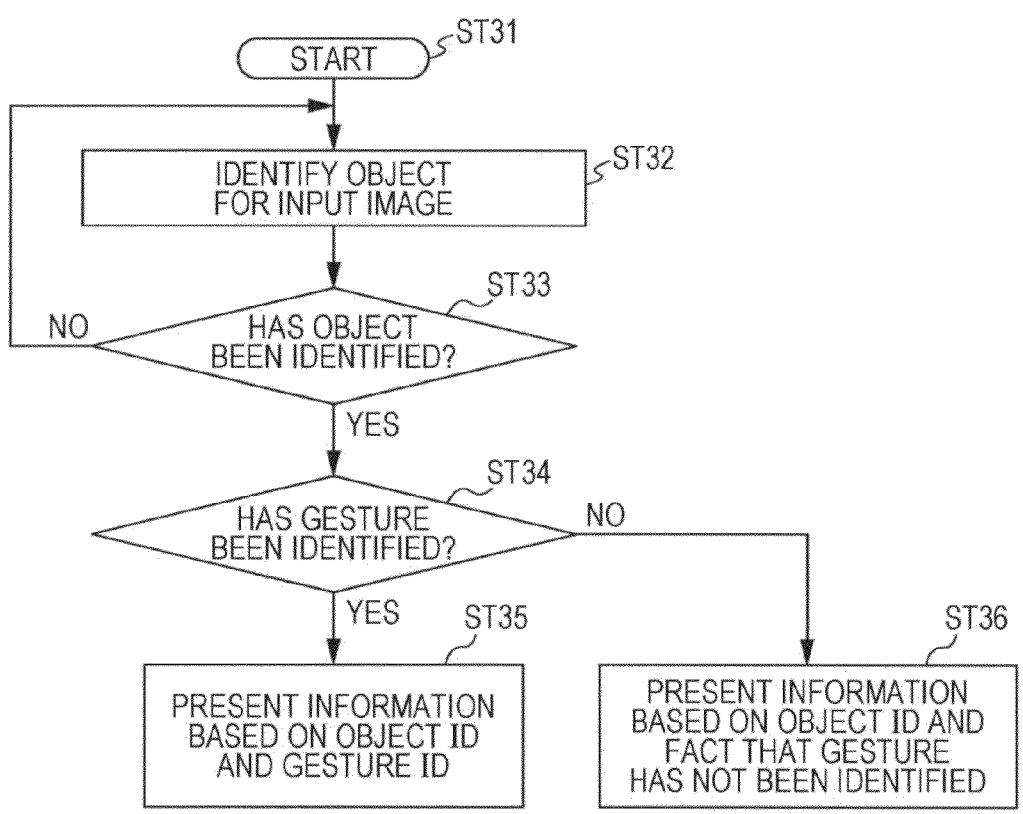
FIG. 12 is a flowchart illustrating an example of a process of information presentation in the information presentation system.

An example of a process for performing information presentation by the information presentation system 300 illustrated in FIG. 11 will now be explained with reference to a flowchart illustrated in FIG. 12. In step ST31, the information presentation system 300 starts the process, for example, when the power is turned on. Then, the information presentation system 300 proceeds to processing of step ST32.

In step ST32, the object recognizing unit 301 performs processing for detecting and identifying an object for input image data and obtains object identification information. In this processing, for example, a user captures an image of a specific object using an image pickup unit (camera) attached to the client device 500A to obtain input image data. Alternatively, in this processing, for example, a user selects image data stored in a storing unit of the client device 500A to obtain input image data.

In step ST33, the information presentation system 300 determines whether or not an object has been identified. When an object has been identified, the gesture recognizing unit 303 determines whether or not a gesture has been identified in step ST34. In this processing, when the degree of certainty of gesture identification is greater than a specific value, the information presentation system 300 determines that a gesture has been identified.

When a gesture has been identified, the information presenting unit 305 acquires content information, such as images, sound, or text, associated with the object identification information and gesture identification information from the presentation information database 306, and presents the acquired content information in step ST35. When a gesture has not been identified, the information presenting unit 305 presents a plurality of pieces of content information, such as images, sound, or text, associated with the object identification information in step ST36, and waits to receive input of a gesture.

Figure 13:
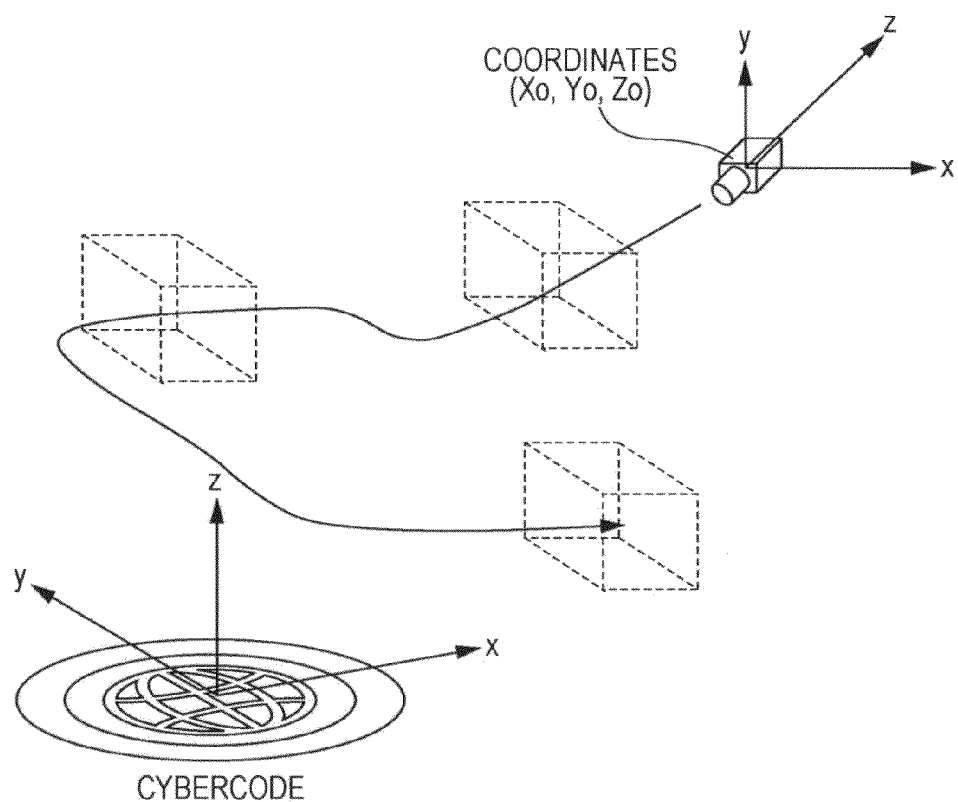
FIG. 13 is a diagram for explaining gesture recognition based on position.

An example of a method for recognizing a gesture will now be explained. Here, gesture recognition based on position will be explained. In this case, as illustrated in FIG. 13, threshold processing is performed for the coordinates (X0, Y0, Z0) of the camera position represented by camera positional information acquired by the object recognizing unit 301. That is, it is calculated whether or not the camera position falls within a specified space. In this processing, any type of coordinate system can be used. In FIG. 13, examples of specified spaces are expressed by broken lines. The individual specified spaces may be in contact with each other.

In the case where moving image data is input, the camera position can be obtained in a time sequence manner. Thus, in this case, it is important to ensure the stability in operations performed by a user by properly performing filtering using a median filter or the like. Furthermore, the state where a recognized object does not exist in a frame, that is, object recognition is not performed, is detected as a state and the result is output.

Various other methods, such as recognition based on time-sequence processing for tracks (Hidden Markov Model (HMM), Dynamic Programming (DP) matching, etc.) and a method in which track-following time is applied using a particle filter or the like, can be employed. However, any method can be employed as long as it is a method for recognizing a gesture on the basis of only the relative positional relationship between an object (target) and a camera.

Specific Examples of Implementation

Specific examples of implementation will now be explained. Here, an example of an information viewing system and an example of an item information presentation system will be explained as a first example and a second example, respectively.

First Example

Information Viewing System

In augmented reality, for example, when information is acquired by holding a camera over a calendar or a poster on a wall, a billboard on a road, an insert in newspaper, a membership card for a golf driving range, or the like, a plurality of pieces of information are presented. A user wants to perform operations such as selection, enlargement, cancellation, and the like for the presented information. With the use of the information presentation system 300 illustrated in FIG. 11, these operations can be realized.

In this example, an information terminal such as a cellular phone including a camera (image pickup unit) is assumed. For example, when capturing an image of a target, a user is able to receive the presentation of a plurality of types of information that can be selected, as illustrated in part (a) of FIG. 14. Then, as illustrated in part (b) of FIG. 14, when the camera is translated, the selected and focused position can be changed. At this time, for the convenience of user operation, for example, a guide representing the selected and focused position is indicated, and the guide is moved so as to represent the selected and focused position in accordance with the movement of the camera position.

Figure 14:
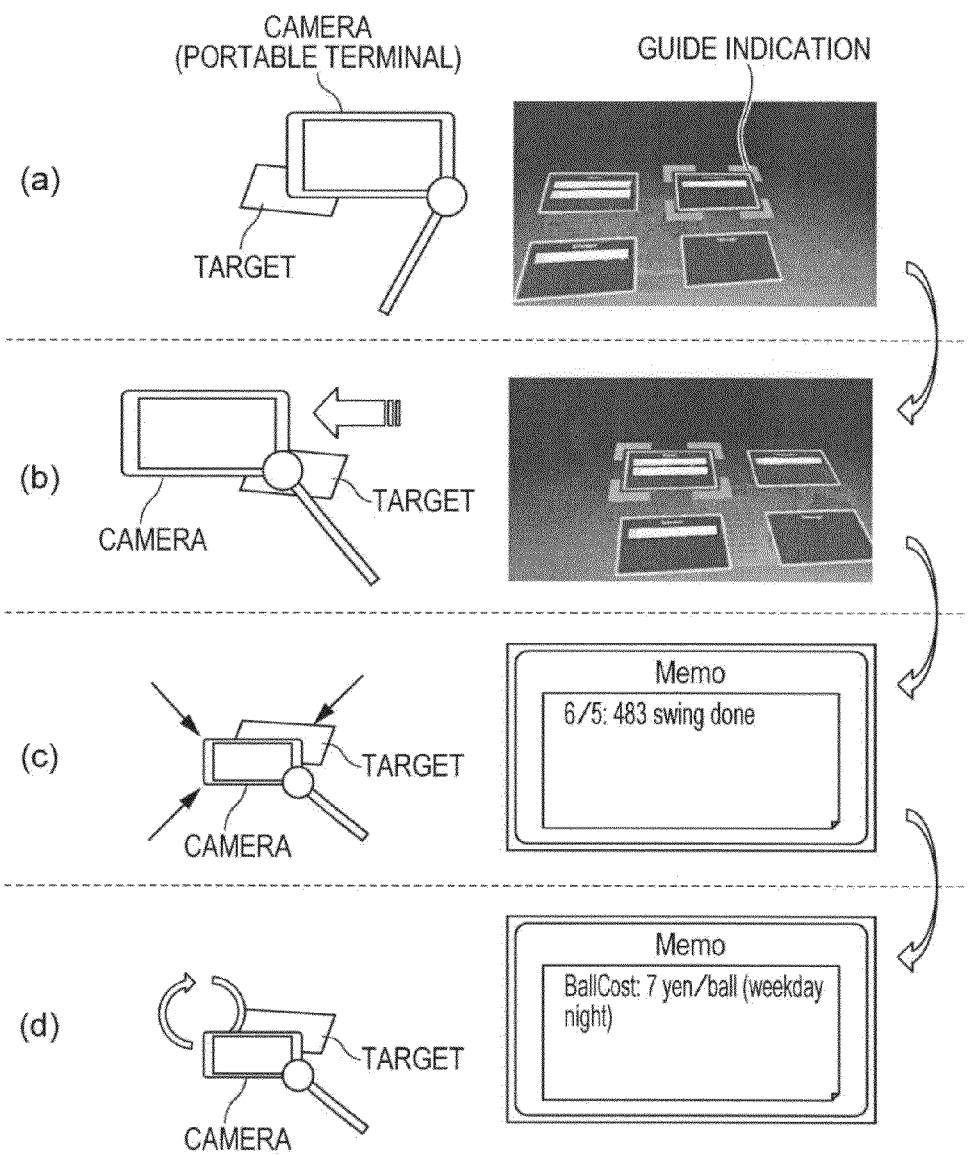
FIG. 14 includes diagrams for explaining an example of an information viewing system as a specific example.

Then, as illustrated in part (c) of FIG. 14, when the camera is moved closer to the target while a type of information is being selected, the type of information can be selected, and the first piece of the selected type of information is presented. In this state, as illustrated in part (d) of FIG. 14, when the camera is moved so as to form a circle above the target, the next piece of information is presented. In this state, registration of information, editing of registered information, and the like can also be performed.

Figure 15:
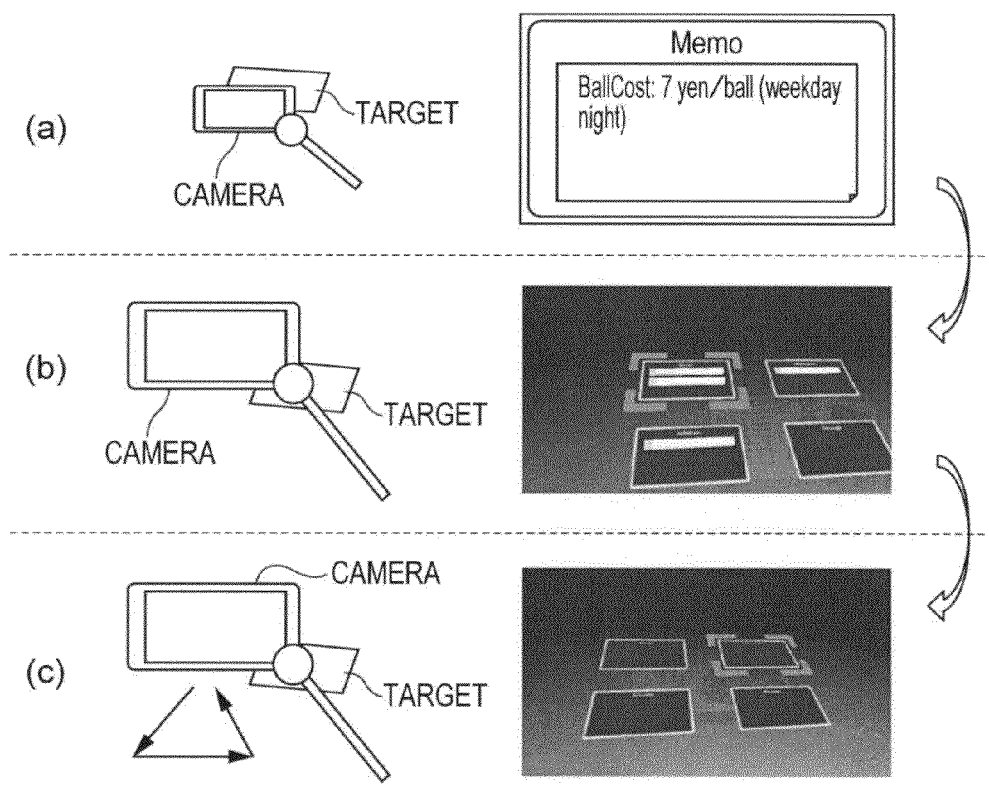
FIG. 15 includes diagrams for explaining an example of an information viewing system as a specific example.

When the camera in the state where a certain type of information is selected as illustrated in part (a) of FIG. 15 is moved away from the target as illustrated in part (b) of FIG. 15, the state where the certain type of information is selected can be cancelled. In this state, when the camera is moved so as to form a triangle above the target as illustrated in part (c) of FIG. 15, information registered in the type of information is deleted.

Second Example

Item Information Presentation System

Figure 16:
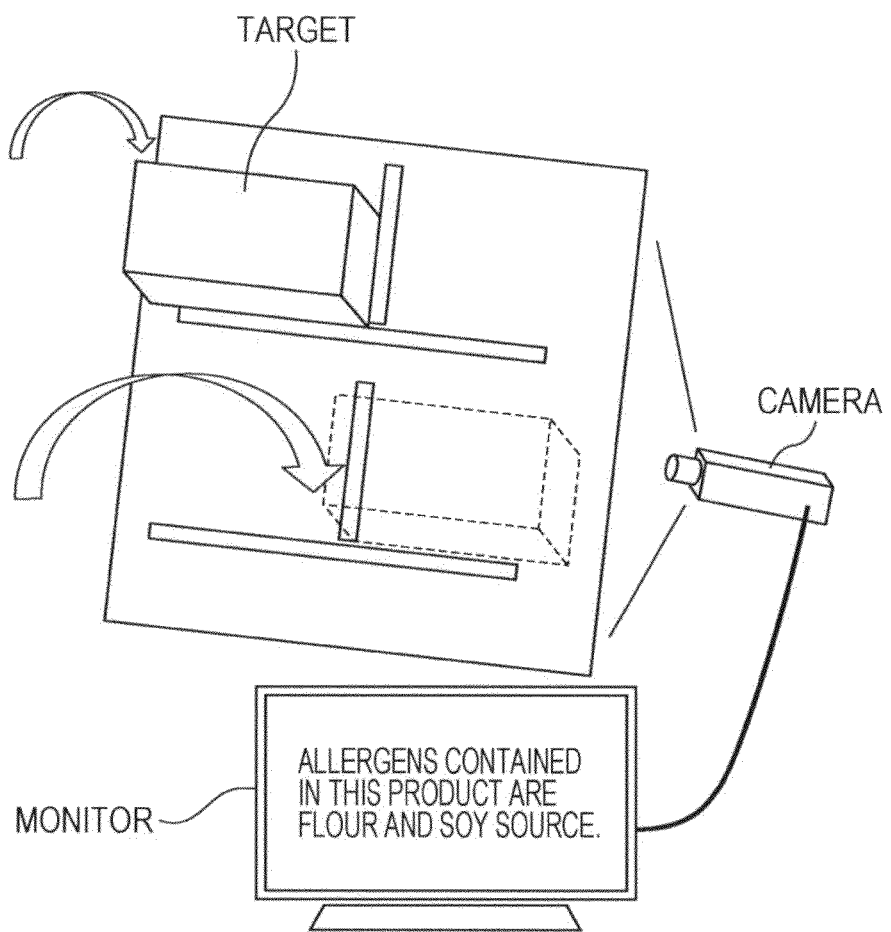
FIG. 16 is a diagram for explaining an example of an item information presentation system as a specific example.

An example in which a target is moved while a camera is being fixed, which is contrary to the first example described above, will be explained as a second example. In augmented reality, information can be acquired when a user holds a camera over a target. For example, as illustrated in FIG. 16, an image of the back side of transparent shelves is captured with a camera. Information to be presented is changed in accordance with which part of the shelves an item is placed by a user. This system can be implemented without difficulty since the system does not use an identification chip or the like and the system uses only a camera and a monitor.

Figure 17:
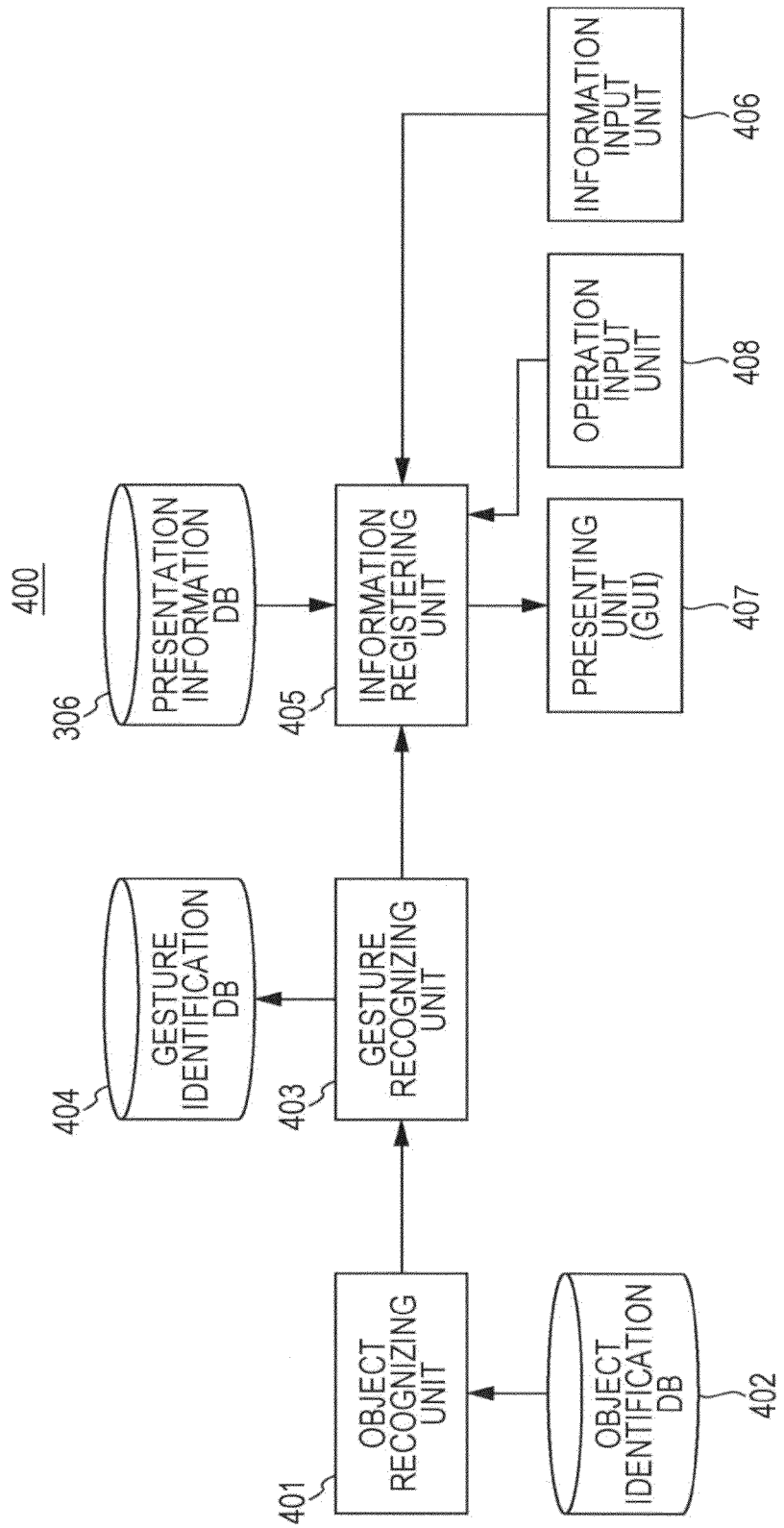
FIG. 17 is a block diagram illustrating an example of the configuration of an information registration system.

FIG. 17 illustrates an example of the configuration of an information registration system 400 for registering content information such as images, sound, and text in the presentation information database 306 of the information presentation system 300 illustrated in FIG. 11. The information registration system 400 includes an object recognizing unit 401, an object identification database 402, a gesture recognizing unit 403, a gesture identification database 404, and an information registering unit 405. The information registration system 400 also includes an information input unit 406, a presenting unit 407, an operation input unit 408, and a presentation information database 306.

The object recognizing unit 401 is configured similarly to the object recognizing unit 301 of the information presentation system 300 illustrated in FIG. 11. The object recognizing unit 401 performs processing for detecting and identifying an object for image data and obtains object information, on the basis of object identification data stored in the object identification database 402. The image data used here may be image data obtained by capturing an image with an image pickup unit (camera) or image data stored in a semiconductor memory or a hard disk drive serving as a storing unit. In this case, the common object identification database 402 is used in a system so that an object is not recognized as a different object. Here, objects include human beings and animals.

An object state acquired by the object recognizing unit 401 includes, for example, object identification information (object ID) and positional information on a camera (image pickup unit) relative to the object. The camera positional information is based on, for example, the position of the object, and serves as relative positional information on the relative position between the object and the camera. The object recognizing unit 401 recognizes an object on the basis of, for example, positions of characteristic points of the object contained in an image.

The object recognizing unit 401 also calculates, on the basis of the positions of the characteristic points of the object, for example, the position of the camera (image pickup unit) relative to the object. That is, the object recognizing unit 401 calculates the position of the camera on the basis of how the object (target) appears in the image and on the basis of the actual size of the object described in a recognition dictionary registered in advance in the object identification database 402. The processing by the object recognizing unit 401 will not be explained in detail below and is described, for example, in Japanese Unexamined Patent Application Publication No. 2008-304268 by this applicant.

The gesture recognizing unit 403 is configured similarly to the gesture recognizing unit 303 of the information presentation system 300 illustrated in FIG. 11. The gesture recognizing unit 403 performs processing for detecting and identifying a gesture for the camera positional information output from the object recognizing unit 401 and obtains gesture identification information (gesture ID), on the basis of gesture identification data stored in the gesture identification database 404.

The information registering unit 405 registers content information input from the information input unit 406, in association with the object identification information (object ID) and the gesture identification information (gesture ID) described above, in the presentation information database

306. The content information may be, for example, various types of content information such as images, sound, and text. The information registering unit 405 registers a type of content information that is selected by a user, for example, in accordance with an operation performed by the user on the operation input unit 408 using a GUI displayed on the presenting unit 407.

The information registration system 400 illustrated in FIG. 17 can also be, for example, the client device 500A illustrated in FIG. 2A or the network system illustrated in FIG. 2B including the client device 500A and the server device 500B that are connected over the network 500C. In the case of the network system illustrated in FIG. 2B, units forming the information registration system 400 are appropriately allocated in a distributed manner to the client device 500A and the server device 500B. For example, the object recognizing unit 401, the object identification database 402, the gesture recognizing unit 403, the gesture identification database 404, and the presentation information database 306 can be allocated to the server device 500B.

An example of a process for performing information registration by the information registration system 400 illustrated in FIG. 17 will now be explained with reference to a flowchart illustrated in FIG. 18. In step ST41, the information registration system 400 starts the process. Then, the information registration system 400 proceeds to processing of step ST42. In step ST42, the object recognizing unit 401 performs processing for detecting and identifying an object for input image data, and obtains object identification information. In this processing, for example, a user captures an image of a specific object with an image pickup unit (camera) attached to the client device 500A, and obtains input image data. Alternatively, for example, the user selects image data stored in a storing unit of the client device 500A, and obtains input image data. The information registration system 400 determines whether or not an object has been identified in step ST43. When an object has been identified in step ST43, the process proceeds to step ST44.

In step ST44, the information registration system 400 determines whether or not inputting for information registration has been performed. When the gesture recognizing unit 403 identifies a gesture or a registration button of the operation input unit 408 is pressed, the information registration system 400 determines that inputting for information registration has been performed. When inputting for information registration has been performed, the information registration system 400 proceeds to step ST45.

In step ST45, the information registration system 400 presents information registration GUI based on object identification information (object ID) and gesture identification information (gesture ID), on the presenting unit 407. That is, the object identification information, the gesture identification information, and a type of content information that can be input are presented on the presenting unit 407. For example, when any of images, sound, and text can be input, a message indicating that any of images, sound, and text can be input is displayed on the presenting unit 407.

In step ST46, the information registration system 400 determines whether or not the presented type of content information has been input. The user is able to input desired content information from the information input unit 406. When content information is input, the information registering unit 405 registers the input details in the presentation information database 306, in association with the object identification information and the gesture identification information.

As described above, in the information presentation system 300 illustrated in FIG. 11, presentation of information is controlled on the basis of object identification information and relative positional information (gesture identification information). Thus, information associated with an object and a gesture can be fetched and presented from the presentation information database 306. Furthermore, information desired by a user can be presented without a touch point or button operation. For example, when capturing an image of a target with a camera (image pickup unit), a user is able to perform an operation only by moving a camera or moving a target. Consequently, a plurality of pieces of information can be presented for a target (object).

4. Modifications

In the embodiments described above, individual databases are arranged separately. However, a database may include a plurality of types of databases. Furthermore, in the embodiments described above, in the case where a network system includes individual devices, individual units are appropriately allocated to the client device 500A and the server device 500B in a distributed manner.

However, the client device 500A may include all the functional units, and the server device 500B may include a recognizing unit and a database, in an appropriate manner. In this case, when communication is satisfactory, the server device 500B can efficiently perform recognition processing. Even when communication is not satisfactory, all the processing can be performed only by the client device 500A, thus causing no trouble in presentation of information.

Furthermore, in the embodiments described above, object recognition is performed in an optical manner (using a camera etc.). However, object recognition is not necessarily performed in an optical manner (using a camera etc.). For example, any unit, such as a wireless device (Bluetooth® etc.) or a combination of a distance surveying device (ultrasonic, laser, etc.) and a sensor having an identifying function, can be used as long as the unit can identify an object and acquire the relative position.

The present technology may employ the following configurations:

(1) An information registration device including an object information acquiring unit that acquires object information obtained by performing processing for detecting and identifying an object for image data; and a content information registering unit that registers target content information in a database in association with the object information.

(2) The information registration device described in (1), wherein the object information includes meta-information on the object as well as object identification information.

(3) The information registration device described in (2), wherein the meta-information includes at least one of positional information on the object and attitude information on the object.

(4) The information registration device described in any one of (1) to (3), further including a user identification information acquiring unit that acquires user identification information obtained by processing for detecting and identifying a user, wherein the content information registering unit registers the target content information in the database in association with the object information and the user identification information.

(5) The information registration device described in any one of (1) to (4), further including a registration environmental information acquiring unit that acquires registration environmental information, wherein the content information registering unit registers the target content information in the database in association with the object information and the registration environmental information.

(6) The information registration device described in (5), wherein the registration environmental information includes at least one of positional information and time information.

(7) An information registration method including acquiring object information obtained by performing processing for detecting and identifying an object for image data; and registering target content information in a database in association with the object information.

(8) A program for causing a computer to function as object information acquiring means for acquiring object information obtained by performing processing for detecting and identifying an object for image data; and content information registering means for registering target content information in a database in association with the object information.

(9) An information registration system including an image data acquiring unit that acquires image data; an object recognizing unit that acquires object information by performing processing for detecting and identifying an object for the image data; a database; a content information input unit that inputs target content information in the database; and a content information registering unit that registers the target content information in the database in association with the object information.

(10) An information presentation device including an object information acquiring unit that acquires object information obtained by performing processing for detecting and identifying an object for image data; and a content information presenting unit that acquires content information associated with the object information and presents the acquired content information.

(11) The information presentation device described in (10), wherein the object information includes meta-information on the object as well as object identification information.

(12) The information presentation device described in (11), wherein the meta-information includes at least one of positional information on the object and attitude information on the object.

(13) The information presentation device described in any one of (10) to (12), further including a user identification information acquiring unit that acquires user identification information obtained by processing for detecting and identifying a user, wherein the content information presenting unit acquires content information associated with the object information and the user identification information and presents the acquired content information.

(14) The information presentation device described in any one of (10) to (13), further including a viewing environmental information acquiring unit that acquires viewing environmental information, wherein the content information acquired by the content information presenting unit includes registration environmental information added thereto, and the content information presenting unit determines the order in which the acquired content information is to be presented, the content information including a specific number of pieces of information, on the basis of the viewing environmental information and the registration environmental information.

(15) The information presentation device described in any one of (10) to (14), further including an image pickup unit that acquires the image data; and a relative positional information acquiring unit that acquires relative positional information on the relative position between the object and the image pickup unit, the relative positional information being acquired by performing processing on the image data, wherein the content information presenting unit acquires content information associated with the relative positional information as well as the object information and presents the acquired content information.

(16) An information presentation method including acquiring object information obtained by performing processing for detecting and identifying an object for image data; and acquiring content information associated with the object information and presenting the acquired content information.

(17) A program for causing a computer to function as object information acquiring means for acquiring object information obtained by performing processing for detecting and identifying an object for image data; and content information presenting means for acquiring content information associated with the object information and presenting the acquired content information.

(18) An information presentation system including an image data acquiring unit that acquires image data; an object recognizing unit that acquires object information by performing processing for detecting and identifying an object for the image data; and a content information presenting unit that acquires content information associated with the object information and presents the acquired content information.

The present disclosure contains subject matter related to that disclosed in Japanese Priority Patent Application JP 2011-249178 filed in the Japan Patent Office on Nov. 14, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information registration device comprising:
a processor configured to:
acquire object information obtained by performing processing for detecting and identifying an object for image data;
acquire relative position information regarding a relative position of a camera with respect to the object;
register a plurality of pieces of target content information in a database in association with the object information; and
control an order in which the plurality of pieces of target content information are presented on a display based on a priority determined for each of the plurality of pieces of target content information,
wherein the priority for each of the plurality of pieces of target content information is determined based on at least the relative position information regarding the relative position of the camera with respect to the object.

2. An information registration method performed by an electronic device, the method comprising:
acquiring, by the electronic device, object information obtained by performing processing for detecting and identifying an object for image data;
acquiring, by the electronic device, relative position information regarding a relative position of a camera with respect to the object;
registering, by the electronic device, a plurality of pieces of target content information in a database in association with the object information; and
controlling, by the electronic device, an order in which the plurality of pieces of target content information are presented on a display based on a priority determined for each of the plurality of pieces of target content information, wherein the priority for each of the plurality of pieces of target content information is determined based on at least the relative position information regarding the relative position of the camera with respect to the object.

3. A non-transitory computer-readable storage medium storing computer-readable instructions, that when executed by a computer, cause the computer to execute a method comprising:
  acquiring object information obtained by performing processing for detecting and identifying an object for image data;
  acquiring relative position information regarding a relative position of a camera with respect to the object;
  registering a plurality of pieces of target content information in a database in association with the object information; and
  controlling an order in which the plurality of pieces of target content information are presented on a display based on a priority determined for each of the plurality of pieces of target content information,
  wherein the priority for each of the plurality of pieces of target content information is determined based on at least the relative position information regarding the relative position of the camera with respect to the object.

4. The non-transitory computer-readable storage medium according to claim 3, wherein the object information includes meta-information on the object as well as object identification information.

5. The non-transitory computer-readable storage medium according to claim 4, wherein the meta-information includes at least one of positional information on the object and attitude information on the object.

6. The non-transitory computer-readable storage medium according to claim 3, further comprising:
  acquiring user identification information obtained by processing for detecting and identifying a user; and
  registering the plurality of pieces of target content information in the database in association with the object information and the user identification information.

7. The non-transitory computer-readable storage medium according to claim 2, further comprising:
  acquiring registration environmental information; and
  registering the plurality of pieces of target content information in the database in association with the object information and the registration environmental information.

8. The non-transitory computer-readable storage medium according to claim 7, wherein the registration environmental information includes at least one of positional information and time information.

9. An information registration system comprising:
  a database; and
  a processor configured to:
    acquire image data;
    acquire object information by performing processing for detecting and identifying an object for the image data;
    acquire relative position information regarding a relative position of a camera with respect to the object;
    input a plurality of pieces of target content information in the database;
    register the plurality of pieces of target content information in the database in association with the object information; and
    control an order in which the plurality of pieces of target content information are presented on a display based on a priority determined for each of the plurality of pieces of target content information,
    wherein the priority for each of the plurality of pieces of target content information is determined based on at least the relative position information regarding the relative position of the camera with respect to the object.

10. An information presentation device comprising:
  a processor configured to:
    acquire object information obtained by performing processing for detecting and identifying an object for image data;
    acquire relative position information regarding a relative position of a camera with respect to the object;
    acquire a plurality of pieces of content information associated with the object information and present the acquired plurality of pieces of content information; and
    control an order in which the plurality of pieces of content information are presented on a display based on a priority determined for each of the plurality of pieces of content information,
    wherein the priority for each of the plurality of pieces of content information is determined based on at least the relative position information regarding the relative position of the camera with respect to the object.

11. An information presentation method performed by an electronic device, the method comprising:
  acquiring, by the electronic device, object information obtained by performing processing for detecting and identifying an object for image data;
  acquiring, by the electronic device, relative position information regarding a relative position of a camera with respect to the object;
  acquiring a plurality of pieces of content information associated with the object information and presenting the acquired plurality of pieces of content information; and
  controlling, by the electronic device, an order in which the plurality of pieces of content information are presented on a display based on a priority determined for each of the plurality of pieces of content information,
  wherein the priority for each of the plurality of pieces of content information is determined based on at least the relative position information regarding the relative position of the camera with respect to the object.

12. A non-transitory computer-readable storage medium storing computer-readable instructions, that when executed by computer, cause the computer to execute a method comprising:
  acquiring object information obtained by performing processing for detecting and identifying an object for image data;
  acquiring relative position information regarding a relative position of a camera with respect to the object;
  acquiring a plurality of pieces of content information associated with the object information and presenting the acquired plurality of pieces of content information; and
  controlling an order in which the plurality of pieces of content information are presented on a display based on a priority determined for each of the plurality of pieces of content information,
  wherein the priority for each of the plurality of pieces of content information is determined based on at least the relative position information regarding the relative position of the camera with respect to the object.

13. The non-transitory computer-readable storage medium according to claim 12, wherein the object information includes meta-information on the object as well as object identification information.

14. The non-transitory computer-readable storage medium according to claim 13, wherein the meta-information includes at least one of positional information on the object and attitude information on the object.

15. The non-transitory computer-readable storage medium according to claim 12, further comprising:
   acquiring user identification information obtained by processing for detecting and identifying a user; and
   acquiring the plurality of pieces of content information associated with the object information and the user identification information and presenting the acquired plurality of pieces of content information.

16. The non-transitory computer-readable storage medium according to claim 12, further comprising:
   acquiring viewing environmental information, wherein
   the acquired plurality of pieces of content information includes registration environmental information added thereto, and
   the order in which the acquired plurality of pieces of content information is to be presented, the plurality of pieces of content information including a specific number of pieces of information, is determined on the basis of the viewing environmental information and the registration environmental information.

17. The non-transitory computer-readable storage medium according to claim 12, further comprising:
   acquiring the image data, wherein
   the relative position information is acquired by performing processing on the image data, and
   the plurality of pieces of content information associated with the relative position information as well as the object information are acquired and the acquired plurality of pieces of content information are presented.

18. The non-transitory computer-readable storage medium according to claim 12, further comprising:
   selecting, from among the plurality of pieces of content information, a first piece of content information to be presented on the display based on the relative position information regarding the relative position of the camera with respect to the object.

19. The non-transitory computer-readable storage medium according to claim 18, wherein a different piece of content information, from among the plurality of pieces of content information, is selected to be presented based on a different relative position of the camera with respect to the object.

20. An information presentation system comprising:
   a processor configured to:
   acquire image data;
   acquire object information by performing processing for detecting and identifying an object for the image data;
   acquire relative position information regarding a relative position of a camera with respect to the object;
   acquire a plurality of pieces of content information associated with the object information and present the acquired plurality of pieces of content information; and
   control an order in which the plurality of pieces of content information are presented on a display based on a priority determined for each of the plurality of pieces of content information,
   wherein the priority for each of the plurality of pieces of target content information is determined based on at least the relative position information regarding the relative position of the camera with respect to the object.

* * * * *

UNITED STATES PATENT AND TRADEMARK OFFICE
CERTIFICATE OF CORRECTION

| | | |
|---|---|---|
| PATENT NO. | : 9,020,918 B2 | |
| APPLICATION NO. | : 13/670705 | |
| DATED | : April 28, 2015 | |
| INVENTOR(S) | : Shoichi Ikenoue et al. | |

It is certified that error appears in the above-identified patent and that said Letters Patent is hereby corrected as shown below:

On the title page, Item (54), and in the specification, Column 1, the title is incorrect. Item (54) and Column 1 should read:

-- INFORMATION REGISTRATION DEVICE, INFORMATION REGISTRATION METHOD, INFORMATION REGISTRATION SYSTEM, INFORMATION PRESENTATION DEVICE, INFORMATION PRESENTATION METHOD, INFORMATION PRESENTATION SYSTEM, AND PROGRAM --

Signed and Sealed this
First Day of September, 2015

Michelle K. Lee
*Director of the United States Patent and Trademark Office*